US012626558B2

(12) United States Patent
Takahashi et al.

(10) Patent No.: US 12,626,558 B2
(45) Date of Patent: May 12, 2026

(54) COIN DEPOSIT PROCESSOR

(71) Applicants: LAUREL BANK MACHINES CO., LTD., Tokyo (JP); LAUREL MACHINERY CO., LTD., Osaka (JP); LAUREL PRECISION MACHINES CO., LTD., Osaka (JP)

(72) Inventors: Hitoshi Takahashi, Tokyo (JP); Toru Inake, Tokyo (JP)

(73) Assignees: LAUREL BANK MACHINES CO., LTD., Tokyo (JP); LAUREL PRECISION CO., LTD., Osaka (JP)

( * ) Notice: Subject to any disclaimer, the term of this patent is extended or adjusted under 35 U.S.C. 154(b) by 895 days.

(21) Appl. No.: 17/769,838

(22) PCT Filed: Oct. 25, 2019

(86) PCT No.: PCT/JP2019/041976

§ 371 (c)(1),
(2) Date: Apr. 18, 2022

(87) PCT Pub. No.: WO2021/079502

PCT Pub. Date: Apr. 29, 2021

(65) Prior Publication Data

US 2022/0383688 A1 Dec. 1, 2022

(51) Int. Cl.
*G07D 11/24* (2019.01)
*G07D 11/23* (2019.01)
(Continued)

(52) U.S. Cl.
CPC ............. *G07D 11/24* (2019.01); *G07D 11/23* (2019.01); *G07D 11/237* (2019.01); *G07D 11/34* (2019.01); *G07D 11/50* (2019.01); *G07D 11/60* (2019.01)

(58) Field of Classification Search
CPC ........ G07D 11/24; G07D 11/50; G07D 11/60; G07D 2211/00; G07D 11/237;
(Continued)

(56) References Cited

U.S. PATENT DOCUMENTS 11,108,926 B2 * 8/2021 Matsuoka .......... H04N 1/00326
2008/0060906 A1 * 3/2008 Fitzgerald .............. G07D 11/50
194/207
(Continued)

FOREIGN PATENT DOCUMENTS

JP 3-111991 5/1991
JP 9-153168 6/1997
(Continued)

OTHER PUBLICATIONS

International Search Report for PCT/JP2019/041976, mailed Dec. 3, 2019, 3 pages.

*Primary Examiner* — Jeffrey A Shapiro
(74) *Attorney, Agent, or Firm* — Nixon & Vanderhye P.C.

(57) ABSTRACT

A currency deposit processor transfers currencies set in a deposit part one by one, discriminates the currencies by denominations, stores the currencies in denominations in a storage part without temporarily holding the currencies, and confirms the deposited currencies for each transaction. A control unit is provided that, when one storage part reaches its maximum capacity with both currencies confirmed up to a previous deposit transaction and currencies unconfirmed in a current deposit transaction and a failure occurs after the filling-up currencies are removed, performs a special control, in which data on the currencies unconfirmed in the current deposit transaction and included in the filling-up currencies is calculated as a partial confirmation, and the data on the currencies calculated as the partial confirmation
(Continued)

is added and reflected at a time of another deposit transaction after a fault recovery process.

4 Claims, 11 Drawing Sheets

(51) Int. Cl.

| | |
|---|---|
| ***G07D 11/237*** | (2019.01) |
| ***G07D 11/34*** | (2019.01) |
| ***G07D 11/50*** | (2019.01) |
| ***G07D 11/60*** | (2019.01) |

(58) Field of Classification Search

CPC ........ G07D 11/23; G07D 11/30; G07D 11/32; G07D 11/34; G07D 11/36; G07D 11/22; G07D 11/13; G07D 11/14; G07D 11/16; B65H 7/14; B65H 2701/1912; B65H 2301/4314

See application file for complete search history.

(56) References Cited

U.S. PATENT DOCUMENTS

| | | | | |
|---|---|---|---|---|
| 2011/0240734 | A1* | 10/2011 | Sudo | G07D 11/34 235/379 |
| 2017/0073100 | A1* | 3/2017 | Nagase | B65B 13/20 |
| 2018/0204404 | A1* | 7/2018 | Kokubo | G07D 11/50 |
| 2019/0172292 | A1* | 6/2019 | Fukuda | G07D 11/18 |

FOREIGN PATENT DOCUMENTS

| | | |
|---|---|---|
| JP | 3922425 | 5/2007 |
| WO | 2010/067421 | 6/2010 |

* cited by examiner

COIN DEPOSIT PROCESSOR

This application is the U.S. national phase of International Application No. PCT/JP2019/041976 filed Oct. 25, 2019, which designated the U.S. the entire contents of which is hereby incorporated by reference.

TECHNICAL FIELD

The present invention relates to a currency deposit processor.

BACKGROUND ART

There is a banknote deposit processing machine that does not have a temporary holding part and stores deposited currencies directly in stackers to thereby simplify the configuration thereof and reduce the price thereof. In a banknote deposit processing machine, for example, after a deposit transaction for the first transaction has been normally processed, a fault such as a jam may occur during a deposit transaction for the second transaction. In such a case, without a temporary holding part, both confirmed banknotes for the first transaction and unconfirmed banknotes in the process for the second transaction are stored together in a mixed manner in each stacker. In order to recover this, the operator removes all of this mixture of banknotes from the stacker. Then, the operator puts together these banknotes, the banknotes remaining in a hopper, and the banknotes on the jammed transfer passage. The number of these banknotes is then manually counted, and the banknotes are sorted by the number of confirmed notes for the first transaction and the number of notes for the second transaction.

Among banknote deposit processing machines, there is a banknote deposit processing machine that that does not require confirmed notes to be manually sorted even in a case where a fault such as a jam occurs during a deposit transaction for the second transaction after a deposit transaction for the first transaction has been processed normally. In such a banknote deposit processing machine, at the time of recovery from a fault, banknotes that are related to the deposit transaction performed at the time of the fault and banknotes that have already been stored in a stacker and the deposit process for which has been confirmed before the deposit transaction, are re-inserted in a hopper. Then, the overall total of the banknotes that have been re-inserted in the hopper, the notes of the deposit transaction, and the notes of a deposit transaction before the deposit transaction and the deposit process for which has been confirmed, are stored in stackers according to the denominations thereof. At the same time, this banknote deposit processing machine classifies data on the amount of deposit related to the deposit transaction and data on the amount of deposit related to the deposit transaction before this deposit transaction.

PRIOR ART DOCUMENTS

Patent Documents

Patent Document 1: Japanese Patent Publication No. 3922425

SUMMARY OF THE INVENTION

Problem to be Solved by the Invention

In a banknote deposit processing machine that does not have a temporary holding part, when a stacker is in a full-capacity state of where the number of banknotes that have been deposit-processed reaches a predetermined maximum number (for example, 100), the deposit process cannot continue unless the banknotes are removed from the stacker. For example, assume that a deposit transaction for the first transaction has been processed normally, a stacker comes into the full-capacity state while the deposit transaction for the second transaction is still being performed, and a fault such as a jam occurs after the banknotes have been removed from the stacker. As a result, the confirmed banknotes for the first transaction and the unconfirmed banknotes for the second transaction that have been removed from the stacker when the full-capacity state has been reached (for example, 100 notes), and the unconfirmed banknotes for the second transaction that are to be removed when a fault occurs, are all present in a mixed manner For this reason, all of these banknotes have to be re-inserted in the hopper and a return process has to be performed.

Furthermore, the banknotes that filled the stacker and have been removed therefrom may already be bound in the next step in some cases. Therefore undoing binding bands and then performing the return process consequently increases the operation burden on the operator. However, reduction in the operation burden on the operation in such a case has not been possible.

An object of the present invention is to provide a currency deposit processor capable of reducing the burden on the operator associated with the recovery process even if a fault occurs after the currencies filling up have been removed during a deposit transaction.

Means for Solving the Problem

According to a first aspect of the present invention, a currency deposit processor transfers currencies set in a deposit part one by one, discriminates the currencies by denominations, stores the currencies in denominations in a storage part without temporarily holding the currencies, and confirms the deposited currencies for each transaction. A control unit is provided that, when one storage part reaches its maximum capacity with both currencies confirmed up to a previous deposit transaction and currencies unconfirmed in a current deposit transaction and a failure occurs after the filling-up currencies are removed, performs a special control, in which data on the currencies unconfirmed in the current deposit transaction and included in the filling-up currencies is calculated as a partial confirmation, and the data on the currencies calculated as the partial confirmation is added and reflected at a time of another deposit transaction after a fault recovery process.

According to a second aspect of the present invention, in the currency deposit processor according to the first aspect, when aside from the one storage part that was full and from which the currencies have been removed, there is another storage part for a same denomination, the control unit may execute the special control on condition that a value obtained by subtracting a number of the currencies confirmed up to the previous deposit transaction in the other storage part from a number of the currencies calculated as the partial confirmation is 0 or more.

According to a third aspect of the present invention, in the currency deposit processor according to the first or second aspect, the control unit may perform both a return count of the currencies confirmed up to the previous deposit transaction, related to the fault recovery process, and a count related to the re-deposit process.

According to a fourth aspect of the present invention, the currency deposit processor according to any one of the first to third aspects may include: a first display part that displays information related to the data of the unconfirmed currencies in the current deposit transaction, which is calculated as the partial confirmation; and a second display part that displays information related to data of currencies in the storage part that was full and from which the currencies have been removed.

Effect of the Invention

According to the present invention, it is possible to provide a currency deposit processor capable of reducing the burden on the operator associated with the recovery process even if a fault occurs after the currencies filling up have been removed during a deposit transaction.

EMBODIMENTS FOR CARRYING OUT THE INVENTION

Hereinafter, a banknote deposit processor serving as an embodiment of a currency deposit processor according to the present invention will be described, with reference to the drawings.

Figure 1:
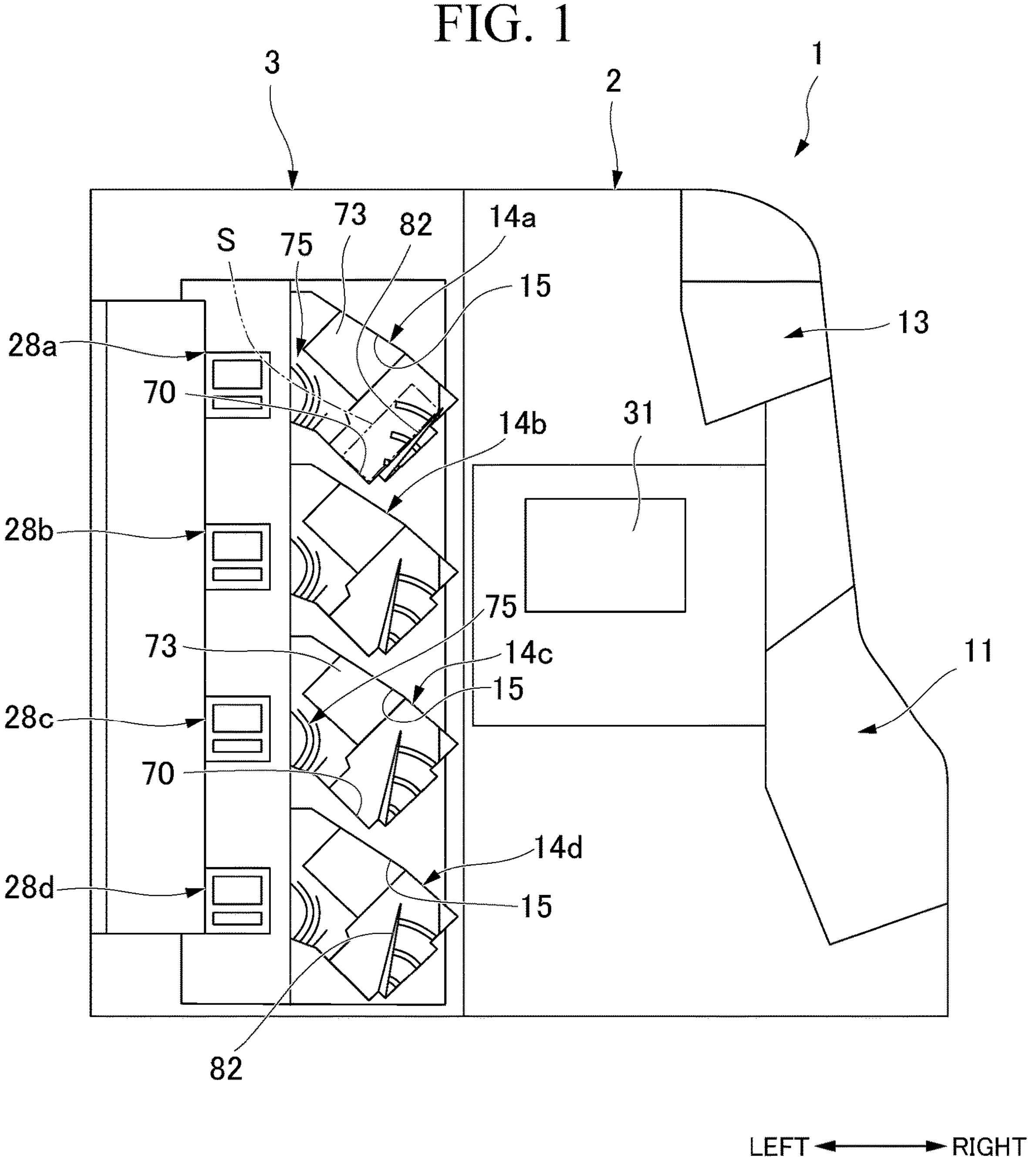
FIG. 1 is a front elevation view showing a banknote deposit processor serving as an embodiment of a currency deposit processor according to the present invention.
Figure 2:
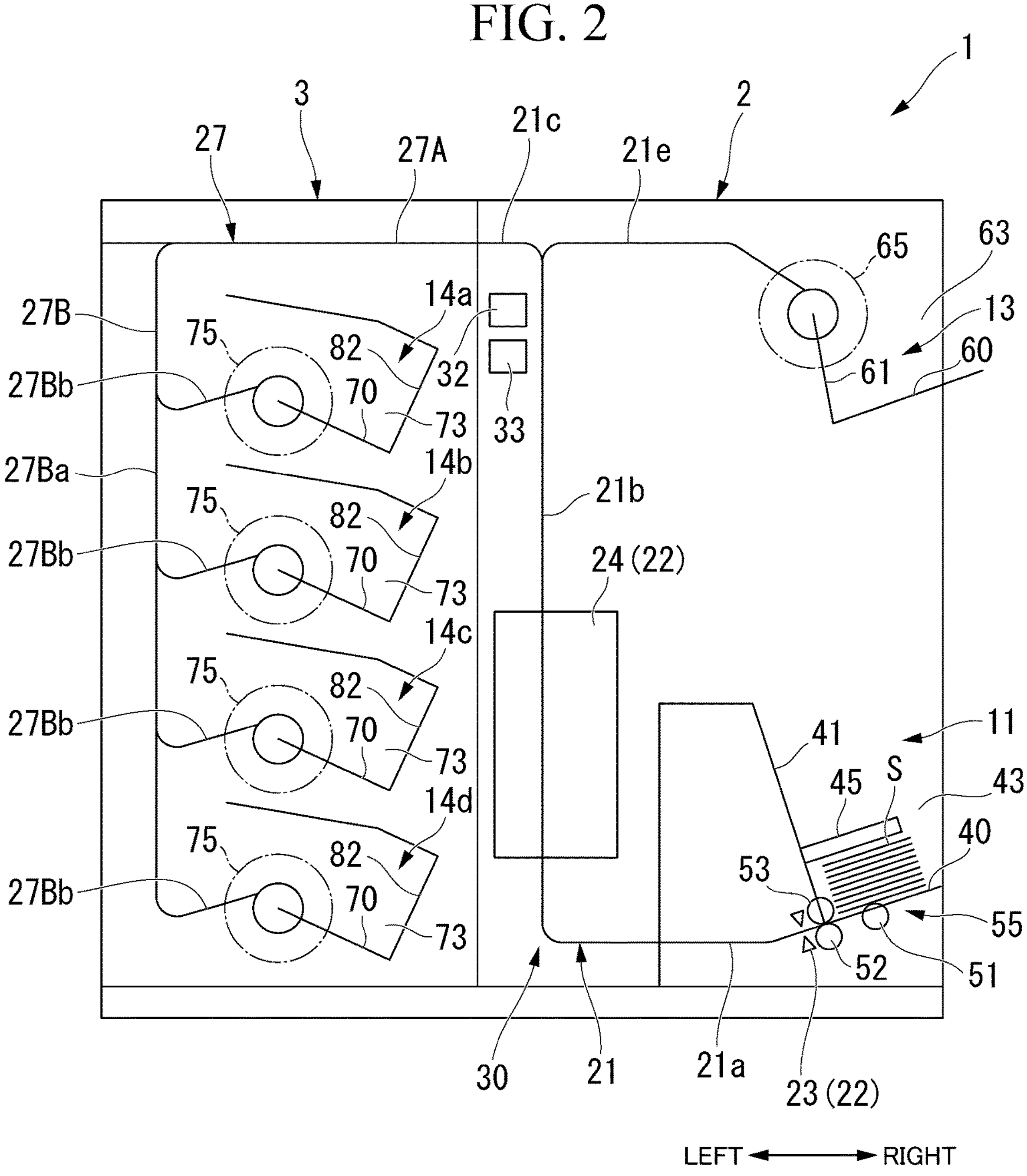
FIG. 2 is a schematic configuration diagram of the interior of the banknote deposit processor serving as the embodiment of the currency deposit processor according to the present invention as viewed from the front side.

As shown in FIG. 1 and FIG. 2, a banknote deposit processor 1 of the present embodiment handles banknotes S as currencies. The banknote deposit processor 1 performs processing to classify banknotes S. The banknote deposit processor 1 classifies deposited banknotes S into counting-target banknotes to be counted and into rejected banknotes not to be counted. The banknote deposit processor 1 further counts counting-target banknotes by type, stores them by type, and displays the counting result and the storage destination in association with each other. In the following description, "front" refers to the operator side, "rear" refers to the opposite side of the operator, "right" refers to the right side as viewed from the operator, and "left" refers to the left side as viewed from the operator.

The banknote deposit processor 1 is configured by combining a counting unit 2 and a storage unit 3. The counting unit 2 transfers and identifies banknotes S one by one, and counts them. The storage unit 3 classifies and stores the banknotes S transferred from the counting unit 2 on the basis of the identification result. The banknote deposit processor 1 can be configured by adding only a single storage unit 3 to a single counting unit 2. Moreover, the banknote deposit processor 1 can also be configured by connecting a plurality of storage units 3 to a single counting unit 2. Here is described a case as an example where only a single storage unit 3 is combined with a single counting unit 2.

The counting unit 2 has a deposit part 11 and a rejection part 13. The deposit part 11 is provided at a lower part on the right-side face side of the counting unit 2. The deposit part 11 is always open to the outside of the counting unit 2, that is, the outside of the banknote deposit processor 1, over the right-side face and the front face of the counting unit 2. The rejection part 13 is provided at an upper part on the right-side face side of the counting unit 2. The rejection part 13 is always open to the outside of the counting unit 2, that is, the outside of the banknote deposit processor 1, over the right-side face and the front face of the counting unit 2.

A plurality of banknotes S are set in the deposit part 11 in a state of being accumulated in the vertical direction while the long side part thereof is aligned with the front-rear direction, and the short side part thereof is aligned with the left-right direction. The deposit part 11 separates the accumulated banknotes S set in this manner one by one, starting with the bottom-most banknote S, feeds them out, and takes them into the banknote deposit processor 1. The banknotes S fed out from the deposit part 11 move along the extending direction of the short side thereof.

The counting unit 2 has thereinside an in-counting-unit transfer constituent part 21 and an identification part 22. The in-counting-unit transfer constituent part 21 transfers banknotes S fed out from the deposit part 11. The identification part 22 counts the banknotes S being transferred by the in-counting-unit transfer constituent part 21 while performing identification of the banknotes S which includes identification of the denomination thereof. The banknotes S being transferred by the in-counting-unit transfer constituent part 21 move along the extending direction of the short side thereof. The identification part 22 has a detection part 23 and an identification main body part 24. The detection part 23 is provided at an end part position of the in-counting-unit transfer constituent part 21 on the deposit part 11 side. The detection part 23 detects the transfer state of the banknotes S being fed out from the deposit part 11. The identification main body part 24 is provided on the side opposite to the deposit part 11 with respect to the detection part 23 of the in-counting-unit transfer constituent part 21. The identification main body part 24 identifies the type of banknotes S, such as denomination discrimination, other than the transfer state thereof.

The in-counting-unit transfer constituent part 21 has a left extended part 21*a*, an upper extended part 21*b*, a left extended part 21*c*, and a branch extended part 21*e*. The left extended part 21*a* extends from the deposit part 11 toward the left-side face of the counting unit 2. The upper extended part 21*b* extends upward from an end part near the left-side face of the left extended part 21*a*. The left extended part 21*c* extends from an upper end part of the upper extended part 21*b* toward the left-side face of the counting unit 2 and opens to the left-side face. The branch extended part 21*e* branches on the upper side of the identification part 22 of the upper extended part 21*b*, and extends toward the right-side face of the counting unit 2. The branch extended part 21*e* is connected to the rejection part 13. In the in-counting-unit transfer constituent part 21, the identification main body part 24 is provided on the upper extended part 21*b* along the vertical direction.

Inside the storage unit 3, there is provided an in-storage-unit transfer constituent part 27. The in-storage-unit transfer constituent part 27 is connected to the left extended part 21*c* of the counting unit 2. The in-storage-unit transfer constituent part 27 transfers banknotes S fed out from the left extended part 21*c*. The banknotes S being transferred in the in-storage-unit transfer constituent part 27 also move along the extending direction of the short side thereof.

The in-storage-unit transfer constituent part 27 has a connection transfer constituent part 27A and a branch transfer constituent part 27B. The connection transfer constituent part 27A opens to an upper part of the right-side face of the storage unit 3, extends horizontally and linearly toward the left-side face of the storage unit 3, and opens to an upper part of the left-side face. The branch transfer constituent part 27B branches from the left side portion of the connection transfer constituent part 27A to the lower side. The connection transfer constituent part 27A and the branch transfer constituent part 27B can each be driven independently of each other. In the case where a plurality of storage units 3 are connected to a single counting unit 2, they are connected in a line along the left-right direction, and adjacent units of the plurality of storage units 3 are connected by connecting the connection transfer constituent parts 27A.

The branch transfer constituent part 27B has a lower extended part 27Ba and a plurality of, specifically, four side extended parts 27Bb. The lower extended part 27Ba branches from the left side portion of the connection transfer constituent part 27A and extends vertically downward. One of the plurality of side extended parts 27Bb extends from a lower end position of the lower extended part 27Ba toward the right-side face of the storage unit 3. The rest of the plurality of side extended parts 27Bb branch and extend from an intermediate position of the lower extended part 27Ba toward the right-side face of the storage unit 3. A collection part 14*a* (storage part) that collects and stores banknotes S is connected to the uppermost side extended part 27Bb of the four side extended parts 27Bb, a similar collection part 14*b* (storage part) is connected to the second uppermost side extended part 27Bb, a similar collection part 14*c* (storage part) is connected to the third uppermost side extended part 27Bb, and a similar collection part 14*d* (storage part) is connected to the lowermost side extended part 27Bb.

Thus, a plurality of, specifically, four collection parts 14*a* to 14*d* are provided for a single storage unit 3. Of the collection parts 14*a* to 14*d*, the collection part 14*a* is arranged on the uppermost side, the collection part 14*b* is arranged second from the top, the collection part 14*c* is arranged third from the top, and the collection part 14*d* is arranged on the lowermost side. The collection parts 14*a* to 14*d* all have the same configuration, and all store banknotes S while collecting them.

As shown in FIG. 1, each of the collection parts 14*a* to 14*d* has an opening part 15. The opening parts 15 are provided on the front face of the storage unit 3, that is, on the front face of the banknote deposit processor 1. The collection parts 14*a* to 14*d* are, at each opening part 15, always open to the outside of the storage unit 3, that is, to the outside of the banknote deposit processor 1. On the front face of the storage unit 3, that is, on the front face of the banknote deposit processor 1 there are provided the same number of collection display parts 28*a* to 28*d* (second display parts) as that of the collection parts 14*a* to 14*d*.

The collection display part 28*a* is provided on the left side of the collection part 14*a* with the height position thereof aligned with that of the collection part 14*a*. The collection display part 28*b* is provided on the left side of the collection part 14*b* with the height position thereof aligned with that of the collection part 14*b*. The collection display part 28*c* is provided on the left side of the collection part 14*c* with the height position thereof aligned with that of the collection part 14*c*. The collection display part 28*d* is provided on the left side of the collection part 14*d* with the height position thereof aligned with that of the collection part 14*d*.

The collection display part 28*a* displays information on the collection display part 14*a*, and displays the number of banknotes S collected in the collection part 14*a*, a device abnormal state of the collection part 14*a*, and a display that prompts removal of banknotes S in the collection part 14*a*. The collection display part 28*b* displays information on the collection display part 14*b*, and displays the number of banknotes S collected in the collection part 14*b*, a device abnormal state of the collection part 14*b*, and a display that prompts removal of banknotes S in the collection part 14*b*. The collection display part 28*c* displays information on the collection display part 14*c*, and displays the number of banknotes S collected in the collection part 14*c*, a device abnormal state of the collection part 14*c*, and a display that prompts removal of banknotes S in the collection part 14*c*. The collection display part 28*d* displays information on the collection display part 14*d*, and displays the number of banknotes S collected in the collection part 14*d*, a device abnormal state of the collection part 14*d*, and a display that prompts removal of banknotes S in the collection part 14*d*.

As shown in FIG. 2, the in-counting-unit transfer constituent part 21 and the in-storage-unit transfer constituent part 27, which are connected to each other, constitute a transfer part 30 for transferring the banknotes S to respective parts within the banknote deposit processor 1. The transfer part 30 transfers banknotes S fed out from the deposit part 11. The identification part 22 identifies the banknotes S while the transfer part 30 is transferring them. A portion of the transfer part 30 opposite to the deposit part 11 with respect to the identification part 22 sorts banknotes S on the basis of the identification result of the identification part 22. The transfer part 30 alternatively sorts banknotes S to one of the rejection part 13 and the plurality of collection parts 14*a* to 14*d*.

In the banknote deposit processor 1, the rejection part 13 and the plurality of collection parts 14 classify banknotes S on the basis of the identification result of the identification part 22 and store them so as to be able to be taken out to the outside of the banknote deposit processor 1. In each of the plurality of collection parts 14*a* to 14*d*, banknotes S are pulled out from the opening part 15 provided in the front face of the banknote deposit processor 1 toward the front of the banknote deposit processor 1 as shown in FIG. 1.

As shown in FIG. 2, the rejection part 13 collects banknotes S identified by the identification part 22 as rejected banknotes among the banknotes S taken into the banknote deposit processor 1 from the deposit part 11, which are not counting-target banknotes, and stores them so as to be able to be taken out to the outside of the banknote deposit processor 1. In the rejection part 13, banknotes S are fed out from the in-counting-unit transfer constituent part 21. The rejection part 13 collects banknotes S being fed out in this manner from the bottom to the top in the order of being fed out, in other words, in the order of the deposit part 11 taking the banknotes in. Having been fed out from the branch extended part 21*e* of the in-counting-unit transfer constituent part 21 to the rejection part 13, the banknotes S are collected from the bottom to the top while the long sides thereof are aligned with the front-rear direction and the short sides thereof are aligned with the left-right direction in the rejection part 13. The sides of the banknotes S facing upward in the deposit part 11 will also face up in the rejection part 13.

The plurality of collection parts 14*a* to 14*d* collect by type, banknotes S that are identified by the identification part 22 as counting-target banknotes and are counted by type among the banknotes S taken into the banknote deposit processor 1 from the deposit part 11, and store them so as to be able to be taken out to the outside of the banknote deposit processor 1. In all of the plurality of collection parts 14*a* to 14*d*, banknotes S are fed out from the in-storage-unit transfer constituent part 27. Each of the collection parts 14*a* to 14*d* collects banknotes S that have been fed out in this manner in the direction from right to left in the feeding out order, in other words, in the order of the deposit part 11 taking the banknotes S in. The side of a banknote S facing upward in the deposit part 11 will face left in the collection parts 14*a* to 14*d*.

Figure 3:
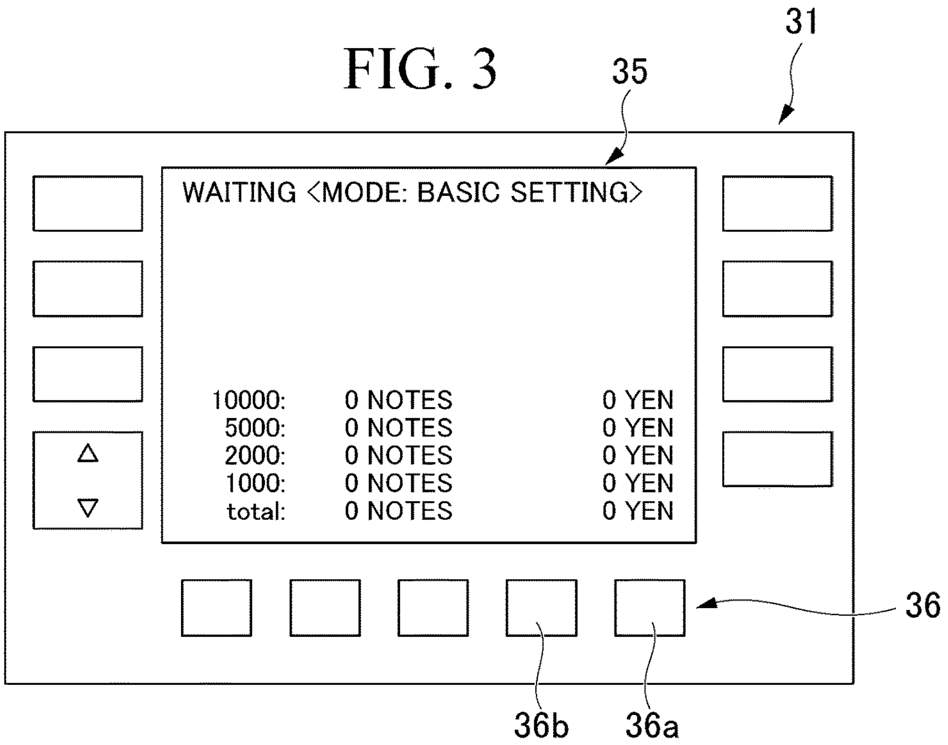
FIG. 3 is a front elevation view showing a display example of an operation display part of the banknote deposit processor serving as the embodiment of the currency deposit processor according to the present invention, and that of a conventional banknote deposit processor.

As shown in FIG. 1, an operation display part 31 that accepts an operation input and displays information, is provided on the front face of the counting unit 2 of the banknote deposit processor 1. As shown in FIG. 3, the operation display part 31 has a display screen 35 (first display part) that performs information display, and operation parts 36 that are provided around the display screen 35 and that accept an operation input of the operator. The display screen 35 displays details of the setting of a deposit process mode and the state of a deposit process.

Moreover, as shown in FIG. 2, a control part 32 and a memory part 33 are provided inside the counting unit 2. The control unit 32 controls each part of the counting unit 2 and the storage unit 3 connected to the counting unit 2. The memory part 33 stores master data serving as an identification reference, data of identification count results, and so forth.

As described above, the deposit part 11 provided in the counting unit 2 is provided so as to be always open to the right side and to the front on the right-side face side of the banknote deposit processor 1. The deposit part 11 has a bottom part 40, a wall part 41, and a wall part 43. The bottom part 40 is arranged so as to be slightly inclined downward to the left with respect to the horizontal direction. The wall part 41 extends upward from the left end position of the bottom part 40 so as to be perpendicular to the bottom part 40. The wall part 43 extends vertically upward from the rear end edge part of the bottom part 40. The bottom part 40 and the wall part 41 extend in the front-rear direction. The wall part 43 extends in a direction orthogonal to the front-rear direction. The bottom part 40, the wall part 41, and the wall part 43 are arranged perpendicular to each other.

Banknotes S are set in the deposit part 11 in a state of being collected on the bottom part 40 so that one long side thereof is brought into contact with the wall part 41 and one short side is brought into contact with the wall part 43. The deposit part 11 has a bill press 45 above the bottom part 40. The bill press 45 moves up and down along the wall part 41. The bill press 45 presses banknotes S placed on the bottom part 40 toward the bottom part 40.

The deposit part 11 has a kicking roller 51, a taking-in roller 52, and a separating roller 53. The kicking roller 51 kicks the bottom-most banknote S of the banknotes S set on the bottom part 40 toward the in-counting-unit transfer constituent part 21 on the left. The taking-in roller 52 takes in the banknotes S kicked out by the kicking roller 51 into the banknote deposit processor 1 and delivers them to the in-counting-unit transfer constituent part 21. The separating roller 53 separates banknotes S one by one to be taken in by the taking-in roller 52. The kicking roller 51, the taking-in roller 52, and the separating roller 53 form a taking-in part 55 that separates banknotes S set in the deposit part 11 one by one and takes them into the banknote deposit processor 1.

The detection part 23 of the identification part 22 mentioned above is arranged at a position in the vicinity of the deposit part 11 in the left extended part 21*a* of the in-counting-unit transfer constituent part 21. The detection part 23 detects whether or not banknotes S are being fed out from the detection part 11 and the transfer state of the banknotes S. The detection part 23 detects the presence or absence of double feeding on the basis of the light transmittance or the physical thickness of the banknotes S. Moreover, the detection part 23 detects the presence or absence of skew from the difference in detection timing on both sides of banknotes S in the long side direction. Furthermore, the detection part 23 detects the presence or absence of near feeding on the basis of the intervals between the detection timings of adjacent banknotes S. Banknotes S detected by the detection part 23 as having no double feeding, no skewing, and no near feeding are normally transferred banknotes S detected by the detection part 23 as being normally transferred. Banknotes S detected as having any of double feeding, skewing, and near feeding are abnormally transferred banknotes S detected by the detection part 23 as being abnormally transferred. A banknote S that is transferred abnormally is treated as a rejected banknote to be excluded into the rejection part 13.

The identification main body part 24 of the identification part 22 detects an image of a banknote S that is being transferred normally, compares the image data with reference data, and identifies the type of the reference data that can be determined as a match as the type of the banknote S. The banknote S the type of which has been identified in this manner is treated as a banknote S having no identification abnormality. On the other hand, a banknote S for which there is no reference data that can be determined as a match is treated as a banknote S having an identification abnormality. A banknote S having an identification abnormality is treated as a rejected banknote that is to be excluded into the rejection part 13.

The rejection part 13 provided in the counting unit 2 has a bottom part 60, a wall part 61, and a wall part 63. The bottom part 60 is arranged so as to be slightly inclined downward to the left with respect to the horizontal direction. The wall part 61 extends upward from a left end position of the bottom part 60 so as to be substantially perpendicular to the bottom part 60. The wall part 63 extends vertically upward from a rear end edge part of the bottom part 60. The bottom part 60 and the wall part 61 extend in the front-rear direction, and the wall part 63 extends so as to be orthogonal to the front-rear direction.

An impeller 65 is provided at the upper part of the wall part 61. The impeller 65 is provided in the vicinity of a terminal position of the branch extended part 21*e*. The impeller 65 feeds out banknotes S having been transferred by the branch extended part 21*e* to be collected on the bottom part 60. Each impeller 65 has a number of blades provided at predetermined intervals in the circumferential direction and extending to the same circumferential direction side. The impeller 65 rotates so that a side thereof opposed to the bottom part 60 moves from right to left. The impeller blade of the impeller 65 on the side facing the bottom 60 extends so that the fixed end thereof is positioned on the left side and the free end thereof is positioned on the right side when facing the bottom part 60.

The impeller 65 rotates together with a banknote S transferred by the branch extended part 21*e* while sandwiching it between the blades, and pushes, by means of the blades, the banknote S toward the bottom part 60 side, that is, downward when the banknote S comes into contact with the wall part 61 and leaves from between the blades. In the rejection part 13 there is provided a banknote presence/absence sensor, not shown in the drawings, for detecting the presence/absence of banknotes in the rejection part 13.

As shown in FIG. 1, the plurality of collection parts 14*a* to 14*d* provided in the storage unit 3 all have the same configuration. The collection parts 14*a* to 14*d* each have an opening part 15, a storage bottom part 70, a storage back wall part 73, and a supporting stage 82. The storage bottom part 70 is inclined downward to the right with respect to the horizontal direction. The storage back wall part 73 extends on the rear side of the storage bottom part 70. The storage bottom part 70 extends in the front-rear direction with the upward-facing upper face thereof being inclined downward to the right. The front face of the storage back wall part 73 facing forward extends in the vertical direction and the left-right direction. In other words, the storage back wall part 73 extends so as to be orthogonal to the front-rear direction. The supporting stage 82 extends upward to the right with respect to the horizontal direction, from the right end position of the storage bottom part 70. The supporting stage 82 can move in a swing motion.

As shown in FIG. 2, an impeller 75 is provided at a terminal position of each side extended part 27Ba of the branch transfer constituent part 27B. The impeller 75 feeds out banknotes S to the interior of corresponding one of the collection parts 14*a* to 14*d*. Each impeller 75 is provided on the side opposite to the supporting stage 82 of the storage bottom part 70 in the collection parts 14*a* to 14*d*, that is, on the left side. Each impeller 75 has a number of blades provided at predetermined intervals in the circumferential direction and extending to the same circumferential direction side. The impeller 75 rotates so that a side thereof opposed to the supporting stage 82 moves from the upper side to the lower side. The blade of the impeller 75 on the side facing the supporting stage 82 extends so that the fixed end thereof is positioned on the lower side and the free end thereof is positioned on the upper side when facing the supporting stage 82.

The impeller 75 rotates together with a banknote S being transferred from the left side to the right side by corresponding one of the lower extended part 27Ba and the four side extended parts 27Bb of the branch transfer constituent part 27B while sandwiching the banknote S between the blades. When the banknote S comes into contact with the upper face of the storage bottom part 70 and comes out from between the blades, the impeller 75 pushes the banknote S toward the supporting stage 82 side by means of the blades. At this time, the banknote S is supported by the lower end long side thereof being in contact with the upper face of the storage bottom part 70 while having the short sides thereof along the vertical direction, and moves to the supporting stage 82 side while being guided by this upper face, whereby the banknote S is supported with the face thereof on one side in the thickness direction overlapping with the supporting stage 82. Similarly, the banknote S fed out next is supported by the lower end long side thereof being in contact with the upper face of the storage bottom part 70 while having the short sides thereof along the vertical direction, and moves to the supporting stage 82 side while being guided by this upper face, whereby the banknote S is supported with the face thereof on one side in the thickness direction overlapping with the face on the other side in the thickness direction of the banknote S having already been supported by the supporting stage 82. In this manner, the banknotes S are sequentially collected in the thickness direction and supported by the supporting stage 82. Each of the plurality of collection parts 14 is also provided with a banknote presence/absence detection sensor, not shown in the drawings, similar to that in the rejection part 13.

As shown in FIG. 1, the supporting stage 82 provided in the collection part 14*a* supports banknotes S fed out to the collection part 14*a*. As the number of collected banknotes S being fed out to and supported by the collection part 14*a* increases, the supporting stage 82 swings by an angle according to the number of collected banknotes S. The same applies to the support stage 82 provided in each of the collection parts 14*b* to 14*d*.

As shown in FIG. 2, the banknote deposit processor 1 transfers banknotes S of a deposit transaction unit, set in the deposit part 11 one by one, discriminates the counting-target banknotes by denominations, and stores them by denominations in the collection parts 14*a* to 14*d* without temporarily holding them. In this manner, the banknote deposit processor 1 confirms the number of banknotes S for each deposit transaction stored in the collection parts 14*a* to 14*d*. The banknote deposit processor 1 performs such a deposit process.

Banknotes S that undergo the deposit process in the banknote deposit processor 1 are set in the deposit part 11 in a manner such that banknotes being of the same deposit transaction unit are collected in a bundle consecutively in the thickness direction with the long side direction and short side direction thereof aligned.

After having set the banknotes S of a first deposit transaction unit, the operator presses a start button 36*a* of the operation part 36 of the operation display part 31. Then, under control of the control part 32, the deposit part 11 of the banknote deposit processor 1 takes the set banknotes S into the banknote deposit processor 1 one by one from the bottom note. The banknotes S having been taken in in this manner are transferred by the transfer part 30 and identified by the identification part 22. The control unit 32 causes the transfer part 30 to transfer and collect the counting-target banknotes S that have been identified as having been transferred normally and having no identification abnormality and as being counting-target banknotes S and that have been counted by the identification part 22, into one of the corresponding collection parts 14*a* to 14*d*. On the other hand, the control unit 32 causes the transfer part 30 to transfer and collect rejected banknotes S that have been identified by the identification part 22, to the rejection part 13. As described above, counting-target banknotes S are banknotes S to be counted that have been transferred normally and have no identification abnormality. Whereas rejected banknotes S include banknotes S that have been transferred abnormally, banknotes S that have been transferred normally and have an identification abnormality, and non-counting-target banknotes S that have been transferred normally and have no identification abnormality.

Then, for example, when there is no rejected banknote S and all of the banknotes S of a first deposit process unit have been transferred to corresponding collection parts 14*a* to 14*d* and the banknotes S in the deposit part 11 and in the transfer part 30 are depleted, the control unit 32 causes the display screen 35 of the operation display part 31 and the collection display parts 28*a* to 28*d* to display the identification and count result of the identification part 22 for the counting-target banknotes S of the first deposit process unit. When the operator sees this and inputs a confirmation operation to the operation part 36 of the operation display part 31, the control unit 32 confirms the deposit amount and so forth of the banknotes S of the first deposit transaction unit, and ends the deposit process for the banknotes S of the first deposit process unit.

Next, after having set the banknotes S of the second deposit transaction unit, the operator presses the start button 36*a* of the operation part 36 of the operation display part 31. Then, the control unit 32 performs the deposit process for the banknotes S of the second deposit transaction unit in the same manner as that of the banknotes S of the first deposit transaction unit.

In the banknote deposit processor 1, the deposit process for each deposit transaction unit as described above is repeated a plurality of times. In such a case, the deposit process for a plurality of deposit transaction units may be consecutively performed without removing banknotes S from the collection parts 14*a* to 14*d* for each deposit transaction unit. At that time, banknotes S of the plurality of deposit transaction units are collected in the collection parts 14*a* to 14*d*. Here, in the banknote deposit processor 1, the number of banknotes S that can be collected in each of the collection parts 14*a* to 14*d* is set to 100. In other words, each of the collection parts 14*a* to 14*d* is set to be full when 100 banknotes S are stored therein.

Here, there are several modes for sorting banknotes S to the collection parts 14*a* to 14*d* in the deposit process, and the sorting mode is set by a mode setting.

When the mode is set to a basic setting, collection of banknotes into the four collection parts 14*a* to 14*d* is set such that 10,000-yen notes are to be collected in the uppermost collection part 14*a*, 5,000-yen notes in the second uppermost collection part 14*b*, 2,000-yen notes in the third uppermost collection part 14*c*, and 1,000-yen notes in the lowermost collection part 14*d*. In such a case, 10,000-yen notes, 5,000-yen notes, 2,000-yen notes, and 1,000-yen notes all having been transferred normally and having no identification abnormality are counting-target banknotes S.

Moreover, when the mode is set to a deposit sorting mode 1, collection of banknotes into the four collection parts 14*a* to 14*d* is set such that face-up 10,000-yen notes are to be collected in the uppermost collection part 14*a*, face-down 10,000-yen notes in the second uppermost collection part 14*b*, face-up 1,000-yen notes in the third uppermost collection part 14*c*, and face-down 1,000-yen notes in the lowermost collection part 14*d*. In such a case, 10,000-yen notes and 1,000-yen notes all having been transferred normally and having no identification abnormality are counting-target banknotes S. Here, for the sake of simplicity, when banknotes S are set in the deposit part 11, for example, banknotes S the upward facing face of which has the value printed in Chinese numerals thereon are referred to as face-up notes and banknotes S the downward facing face of which has the value printed in Chinese numerals thereon are referred to as face-down notes. The above definitions are used for the sake of simplicity only, and therefore, conversely, banknotes S the downward facing face of which has the value printed in Chinese numerals thereon may be referred to as face-up notes and banknotes S the upward facing face of which has the value printed in Chinese numerals thereon may be referred to as face-down notes.

Moreover, when the mode is set to a deposit sorting mode 2, collection of banknotes into the four collection parts 14*a* to 14*d* is set such that normal 10,000-yen notes are to be collected in the uppermost collection part 14*a*, damaged 10,000-yen notes in the second uppermost collection part 14*b*, normal 1,000-yen notes in the third uppermost collection part 14*c*, and damaged 1,000-yen notes in the lowermost collection part 14*d*. In such a case, 10,000-yen notes and 1,000-yen notes all having been transferred normally and having no identification abnormality are counting-target banknotes S.

Here, unless otherwise specified, the mode setting of the deposit process will be described as the basic setting.

Before describing the control contents of the banknote deposit processor 1 of the present embodiment, first, the conventional control contents will be described for reference.

Figure 4:
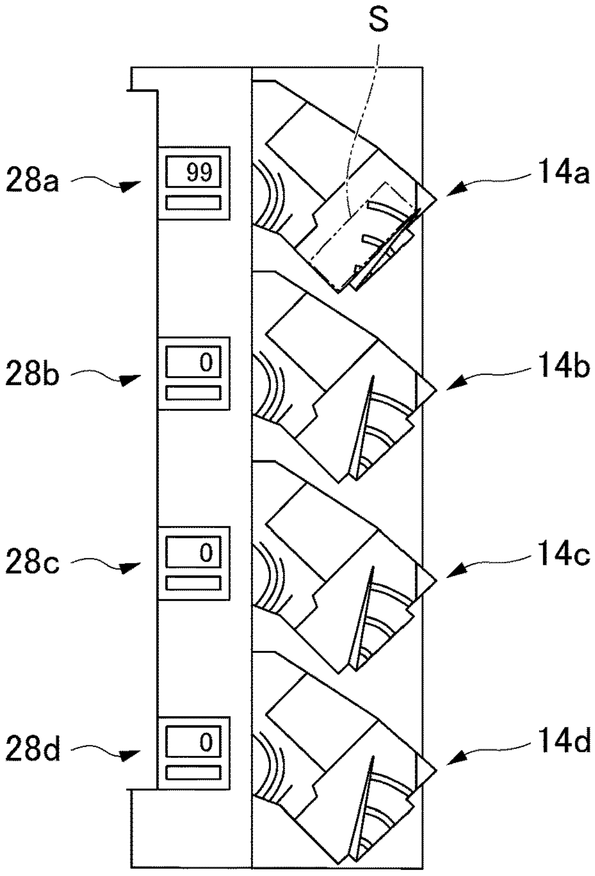
FIG. 4 is a front elevation view showing a display example of a collection display part of the banknote deposit processor serving as the embodiment of the currency deposit processor according to the present invention, and that of the conventional banknote deposit processor.

Banknotes S of the first deposit process unit are set in the deposit part 11, and the start button 36*a* of the operation part 36 of the operation display part 31 is pressed. Then, as described above, the control unit 32 performs a deposit transaction for the banknotes S of the first deposit process unit. As a result of the first deposit transaction, for example, after a deposit of 99 10,000-yen notes has been counted, a completion button 36*b* of the operation part 36 of the operation display part 31 is operated to confirm the transaction, and the processing comes to a state of waiting for the second deposit transaction. Then, the control unit 32 causes the display screen 35 of the operation display part 31 and the collection display parts 28*a* to 28*d* to perform display as illustrated in FIG. 3 and FIG. 4. That is to say, as shown in FIG. 4, the control unit 32 causes the collection display part 28*a* corresponding to the collection part 14*a* to display that 99 10,000-yen notes are present in the uppermost collection part 14*a*. Moreover, as shown in FIG. 3, the control unit 32 displays on the display screen 35 that the current state is a waiting state and the deposit count data is 0.

In this state, when banknotes S of the second deposit process unit are set in the deposit part 11 and the start button 36*a* of the operation part 36 is pressed, the control unit 32 performs a deposit transaction for the banknotes S of the second deposit process unit as the second deposit transaction. For example, assuming that the second deposit process unit includes 10 10,000-yen notes, then in the second deposit transaction, at first one 10,000-yen note of the banknotes S of the second deposit process unit set in the deposit part 11 is transferred to the uppermost collection part 14*a*. As a result, the collection part 14*a* reaches the maximum capacity with the 100 banknotes S therein. Accordingly, the control unit 32 stops taking-in part 55 and the transfer part 30 and uses the collection display part 28*a* and the display screen 35 to provide a guide to advise the operator that the collection part 14*a* has reached the maximum-capacity state and hence deposit counting of the remaining banknotes S in the deposit part 11 cannot be continued until the banknotes S in the collection part 14*a* have been removed.

Next, when the operator is guided by the guide and removes all 100 banknotes S in the uppermost collection part 14*a*, the control unit 32 resumes the deposit counting of the remaining banknotes S in the deposit part 11. If, for example, a fault such as a transfer jam occurs in the banknote deposit processor 1 after the deposit process has been resumed, the control unit 32 stops the taking-in part 55 and the transfer part 30, and causes the display screen 35 of the operation display part 31 to display "fault recovery guide" to provide a fault recovery guide. Then, the operator removes the jammed banknotes collected in the transfer part 30 in accordance with the "fault recovery guide", and presses the reset button, not shown in the drawings, of the banknote deposit processor 1. Then, the control unit 32 causes the banknote deposit processor 1 to perform a reset operation. When this reset operation is completed and removal of all remaining banknotes S in the transfer part 30 and the collection parts 14*a* to 14*d* is detected, the control unit 32 determines the fault recovery process as being completed.

Figure 5:
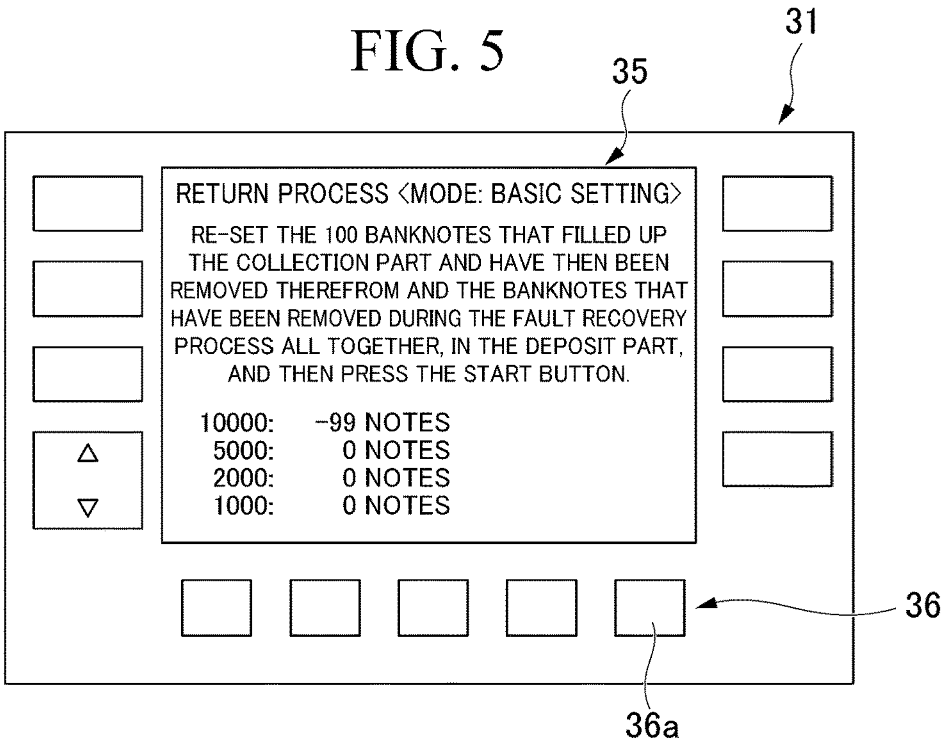
FIG. 5 is a front elevation view showing a display example of an operation display part of the conventional banknote deposit processor.
Figure 6:
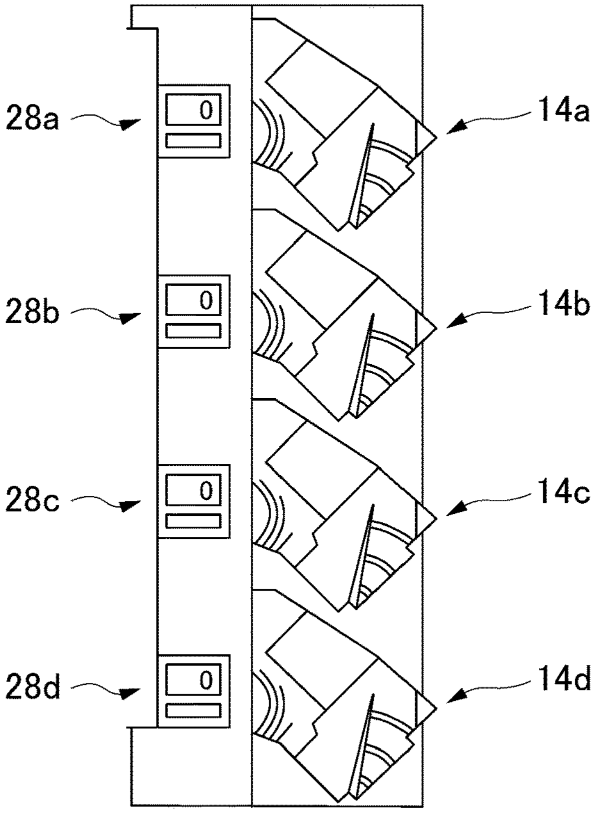
FIG. 6 is a front elevation view showing a display example of the collection display part of the conventional banknote deposit processor.

Subsequently, the control unit 32 causes the display screen 35 of the operation display part 31 to display a "return process operation guide" for providing a guide to return the banknote deposit processor 1 to the state that is prior to the occurrence of the fault and that is a state where the first deposit transaction has been confirmed. Specifically, the guide advises the operator to re-insert in the deposit part 11 the 100 banknotes S removed from the collection part 14*a* as a result of the uppermost collection part 14*a* having reached the maximum-capacity state, and all of the banknotes S having been removed from the deposit part 11, the transfer part 30 and the collection parts 14*a* to 14*d* during the fault recovery process, and press the start button 36*a*. The display state of the display screen 35 at this time is as shown in FIG. 5 and FIG. 6. Here, the display of "10,000: −99 notes" displayed on the display screen 35 indicating that the number of 10,000-yen notes is −99 is to provide a guide to advise that a return process for returning 99 10,000-yen notes to the banknote deposit processor 1 needs to be performed.

Figure 7:
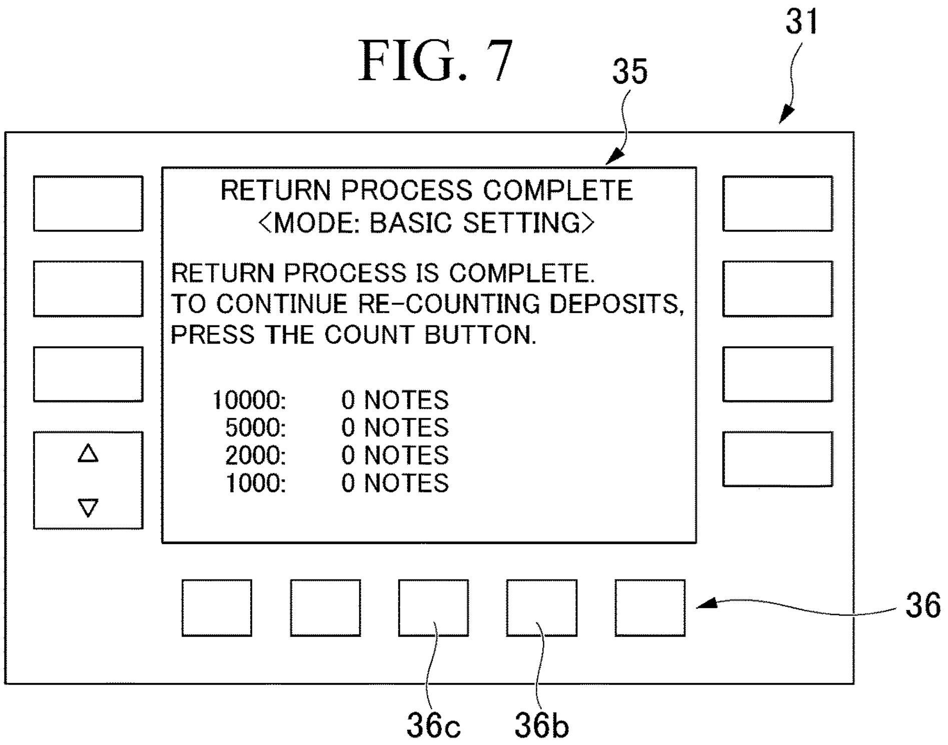
FIG. 7 is a front elevation view showing a display example of the operation display part of the conventional banknote deposit processor.
Figure 8:
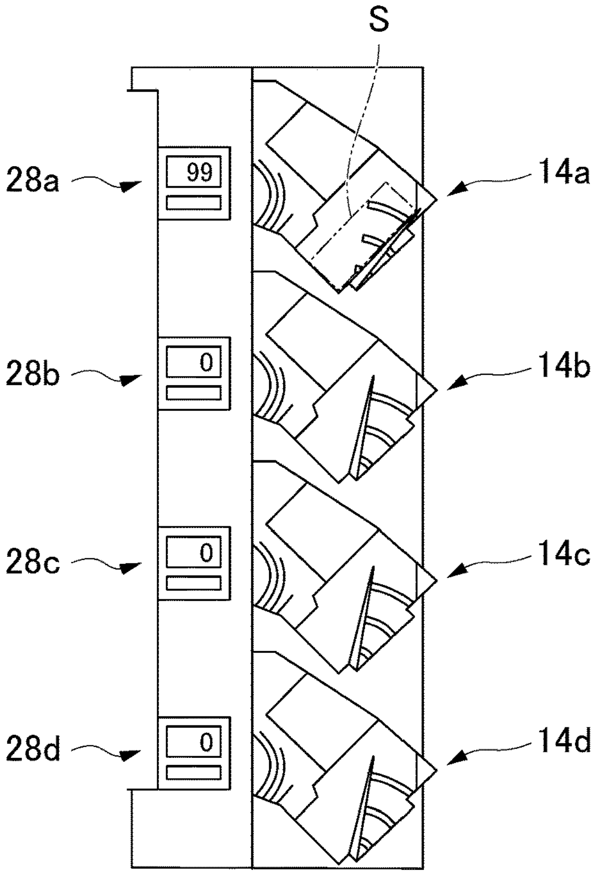
FIG. 8 is a front elevation view showing a display example of the collection display part of the conventional banknote deposit processor.

Then, when, in accordance with the "return process operation guide", the operator sets in the deposit part 11 the 100 banknotes S removed to resolve the maximum-capacity state and the 9 banknotes S removed from the deposit part 11, the transfer part 30 and the collection parts 14*a* to 14*d* and presses the start button 36*a*, the control unit 32 resumes to drive the taking-in part 55 and the transfer part 30. As a result, the banknotes S in the deposit part 11 are fed out one by one, and the banknotes S identified as 10,000-yen notes are collected in the uppermost collection part 14*a*, thus returning to the state where the first deposit transaction has been confirmed, that is, where 99 banknotes S identified as 10,000-yen notes have been collected in the collection part 14*a*. Then, the control unit 32 causes the taking-in part 55 and the transfer part 30 to stop, determines completion of the "return process" to the state where the previous first deposit transaction has been confirmed, and causes the display screen 35 and the collection display parts 28*a* to 28*d* to display to that effect (see FIG. 7 and FIG. 8).

Figure 9:
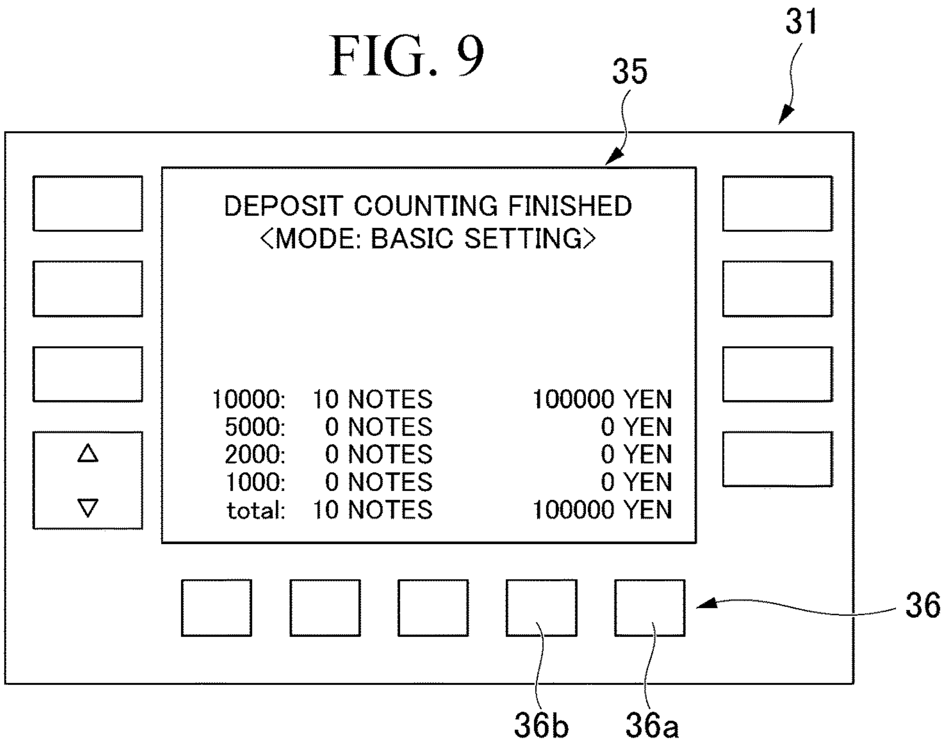
FIG. 9 is a front elevation view showing a display example of the operation display part of the conventional banknote deposit processor.
Figure 10:
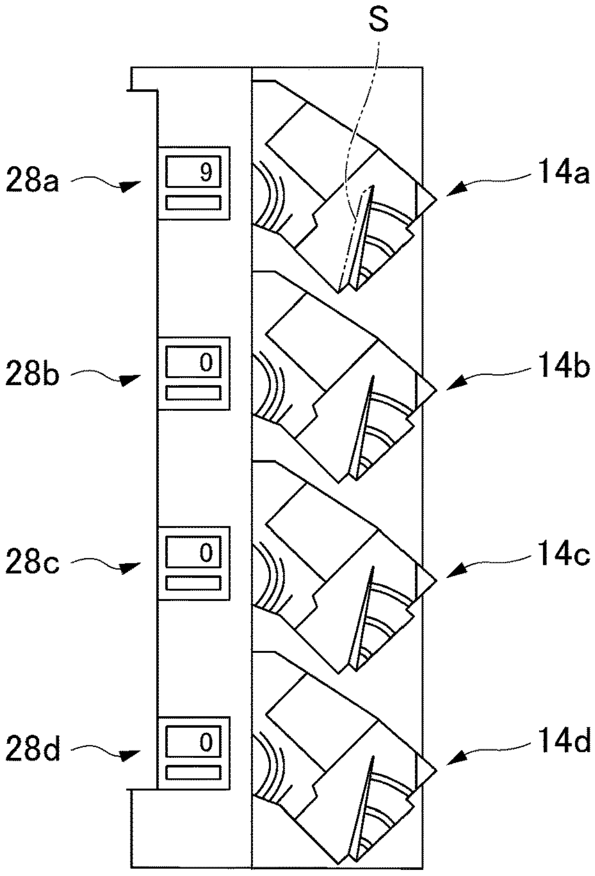
FIG. 10 is a front elevation view showing a display example of the collection display part of the conventional banknote deposit processor.

Subsequently, when the count button 36*c* is pressed, the control unit 32 re-executes the second transaction mentioned above. Then, in the same manner mentioned above, one 10,000-yen note placed in the deposit part 11 is transferred to and collected in the uppermost collection part 14*a*, and the collection part 14*a* reaches the maximum capacity thereof with 100 banknotes S. Then, the control unit 32 causes the taking-in part 55 and the transfer part 30 to stop. When the operator has removed all 100 banknotes S in the uppermost collection part 14*a* in accordance with the guide, the control unit 32 resumes the deposit counting of the remaining banknotes S in the deposit part 11. Then, when the second deposit process has been completed normally without having a fault such as a transfer jam in the banknote deposit processor 1, the control unit 32 causes the display screen 35 and the collection display parts 28*a* to 28*d* to perform the display illustrated in FIG. 9 and FIG. 10. That is to say, as shown in FIG. 9, the control unit 32 causes the display screen 35 to display the deposit count result of the second deposit transaction being 100,000 yen in total, that is, 10 10,000-yen notes, and as shown in FIG. 10, causes the collection display part 28*a* to display that 9 10,000-yen notes have been collected in the uppermost collection part 14*a*. Then, when the completion button 36*b* is pressed by the operator in this state, the control unit 32 confirms and completes the second deposit transaction.

In the above control, if a fault such as a transfer jam occurs in the banknote deposit processor 1 after 100 banknotes S have been removed in order to resolve the maximum-capacity state of the collection part 14*a*, the banknotes S including the 100 banknotes S removed before the occurrence of the fault in order to resolve the maximum-capacity state are re-inserted in the deposit part 11 to be re-counted. Therefore, it is cumbersome for the operator to include the 100 notes removed before the occurrence of the fault in the banknotes S, to be re-inserted in the deposit part 11. For this reason, the operational burden on the operator could not be reduced.

In contrast, the banknote deposit processor 1 of the embodiment performs the following control in the basic setting mode.

In the banknote deposit processor 1 of the embodiment, as with the above description, banknotes S of the first deposit process unit are set in the deposit part 11, and then the start button 36*a* of the operation part 36 is pressed. Then, as described above, the control unit 32 performs a deposit transaction for the banknotes S of the first deposit process unit. As a result of the first deposit transaction, for example, after a deposit of 99 10,000-yen notes has been counted, a completion button 36*b* of the operation part 36 is operated to confirm the transaction, and the processing comes to a state of waiting for the second deposit transaction. Then, the control unit 32 causes the collection display parts 28*a* to 28*d* and the display screen 35 to perform display as illustrated in FIG. 3 and FIG. 4. That is to say, as shown in FIG. 4, the control unit 32 causes the collection display part 28*a* corresponding to the collection part 14*a* to display that 99 10,000-yen notes are present in the uppermost collection part 14*a*. Moreover, as shown in FIG. 3, the control unit 32 displays on the display screen 35 that the current state is a waiting state and that the deposit count data is 0.

In this state, when banknotes S of the second deposit process unit are set in the deposit part 11 and the start button 36*a* of the operation part 36 is pressed, the control unit 32 performs a deposit transaction for the banknotes S of the second deposit process unit as the second deposit transaction. For example, as with the above description, assuming that banknotes S of the second deposit process unit includes 10 10,000-yen notes, in the second deposit transaction, one 10,000-yen note of the banknotes S of the second deposit process unit set in the deposit part 11 is transferred to the uppermost collection part 14*a*. As a result, the collection part 14*a* reaches the maximum capacity with the 100 banknotes S therein. Accordingly, the control unit 32 stops taking-in part 55 and the transfer part 30 and uses the collection display part 28*a* and the display screen 35 to provide a guide to advise the operator that the collection part 14*a* has reached the maximum-capacity state and that deposit counting of the remaining banknotes S in the deposit part 11 therefore cannot be continued until the banknotes S in the collection part 14*a* have been removed to resolve the maximum-capacity state.

Next, when the operator has removed all 100 banknotes S in the uppermost collection part 14*a* in accordance with the guide, the control unit 32 resumes the deposit counting of the remaining banknotes S in the deposit part 11. If, for example, a fault such as a transfer jam occurs in the banknote deposit processor 1 after the deposit process has been resumed, the control unit 32 stops the taking-in part 55 and the transfer part 30, and causes the display screen 35 to display a "fault recovery guide" to provide a guide for fault recovery. Then, the operator removes jammed banknotes collected in the transfer part 30 in accordance with the "fault recovery guide", and presses the reset button, not shown in the drawings, of the banknote deposit processor 1. Then, the control unit 32 causes the banknote deposit processor 1 to perform a reset operation. When this reset operation is completed and all remaining banknotes S in the transfer part 30 and the collection parts 14*a* to 14*d* have been removed, the control unit 32 determines the fault recovery process as being completed.

Figure 11:
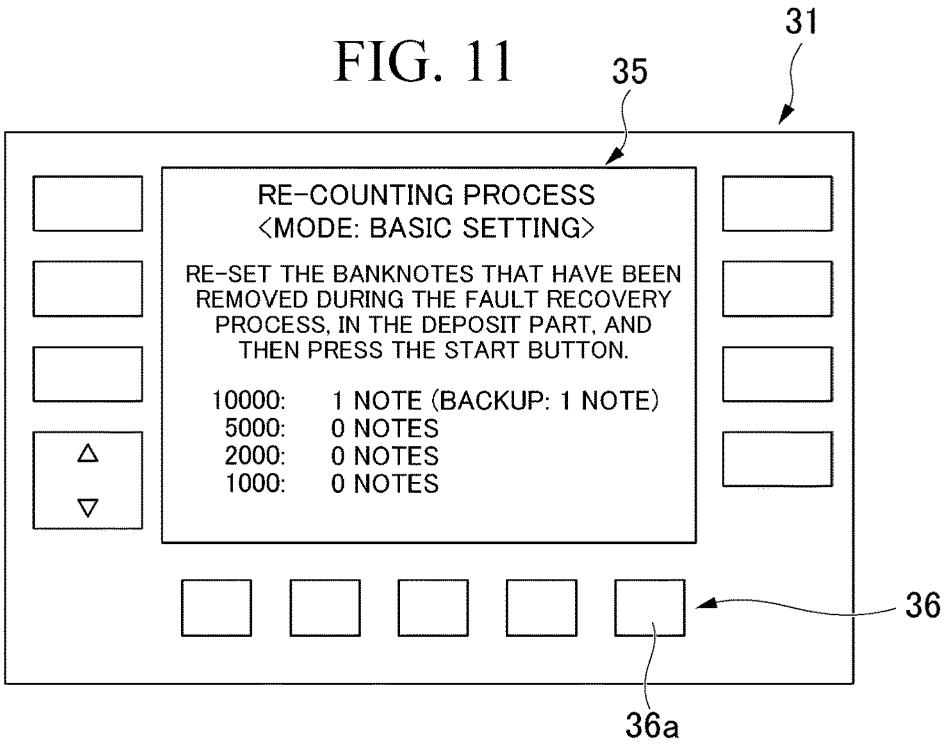
FIG. 11 is a front elevation view showing a display example of the operation display part of the banknote deposit processor serving as the embodiment of the currency deposit processor according to the present invention.
Figure 12:
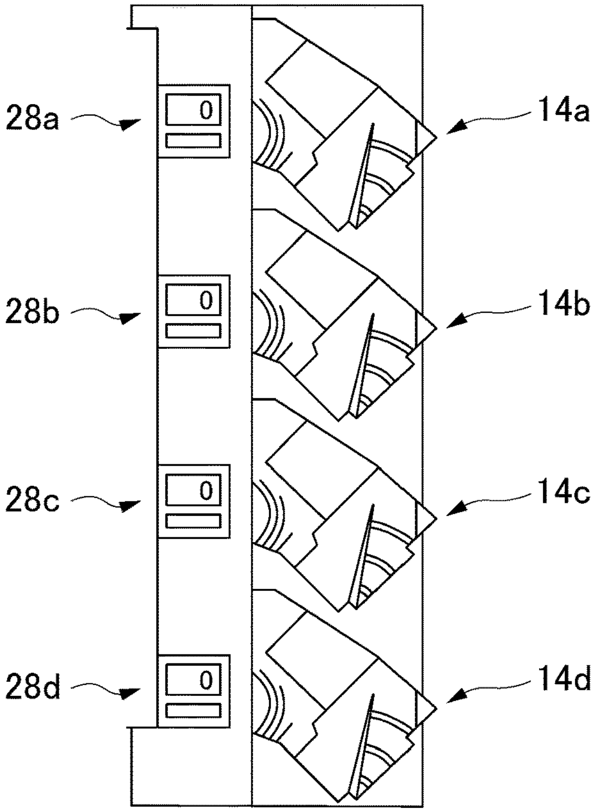
FIG. 12 is a front elevation view showing a display example of the collection display part of the banknote deposit processor serving as the embodiment of the currency deposit processor according to the present invention.

Subsequently, the control unit 32 causes the display screen 35 to display a guide for the operation related to the subsequent continuation process. Specifically, the guide performs a guide to re-insert in the deposit part 11 all of the banknotes S having been removed from the deposit part 11, the transfer part 30 and the collection parts 14*a* to 14*d* during the fault recovery process, and press the start button 36*a*. At this time, a guide for instructing to re-insert the 100 banknotes S removed from the uppermost collection part 14*a* to resolve the maximum capacity state is not performed. As a result, the operator does not re-insert in the deposit part 11 the 100 banknotes S removed from the uppermost collection part 14*a* to resolve the maximum capacity state. The operator re-inserts only the 9 banknotes S removed from the deposit part 11, the transfer part 30 and the collection parts 14*a* to 14*d*, during the fault recovery process. At this time, the control unit 32 sets the display states of the display screen 35 and the collection display parts 28*a* to 28*d* as shown in FIG. 11 and FIG. 12. That is to say, as shown in FIG. 12, the control unit 32 causes the collection display parts 28*a* to 28*d* corresponding respectively to the collection parts 14*a* to 14*d* to display that no 10,000-yen notes are physically present in the collection parts 14*a* to 14*d*. Moreover, as shown in FIG. 11, the control unit 32 causes the display screen 35 to display that the current state is a waiting state and display the deposit count data as logical data such that 1 10,000-yen note has been backed up in the banknote deposit processor 1. The data of the backed-up one 10,000-yen note indicates that 1 10,000-yen note has been transferred to and collected in the collection part 14*a*, causing the collection part 14*a* to reach its maximum capacity with 100 banknotes S during the second deposit transaction, and that as a result, 1 10,000-yen note of the 100 banknotes S removed from the collection part 14*a* is of the second deposit transaction. That is to say, this 1 10,000-yen banknote S can be regarded as 1 10,000-yen banknote S that was confirmed as count data and removed before the occurrence of a fault such as a transfer jam, and therefore, it can be regarded and reflected as the logical data of the following continuation deposit.

In the present embodiment, in the case where any one of the collection parts 14*a* to 14*d* reaches its maximum capacity with 100 banknotes S during the deposit counting as mentioned above and 100 banknotes S are removed therefrom, then, of the removed 100 banknotes S, quantity data (1 10,000-yen note in the above description) that is confirmed as count data in this deposit counting before a fault such as a transfer jam occurs is herein referred to as "partially confirmed" quantity data. Therefore, data of the 1 backed-up 10,000-yen note displayed on the display screen 35 as shown in FIG. 11 is information related to the data of unconfirmed banknotes in the current deposit transaction, which is counted as partially confirmed.

When the display screen 35 and the collection display parts 28*a* to 28*d* are in the states shown in FIG. 11 and FIG. 12, the operator sets in the deposit part 11 the 9 banknotes S removed from the deposit part 11, the transfer part 30 and the collection parts 14*a* to 14*d* in accordance with the contents of the guide on the display screen 35, and presses the start button 36*a*. Then, under the control of the control unit 32, the banknotes S in the deposit part 11 are fed out one by one, and the banknotes S identified as 10,000-yen notes are collected in the uppermost collection part 14*a* and added one by one to the data of the partially confirmed 10,000-yen notes, updating the deposit count data on the display screen 35.

Figure 13:
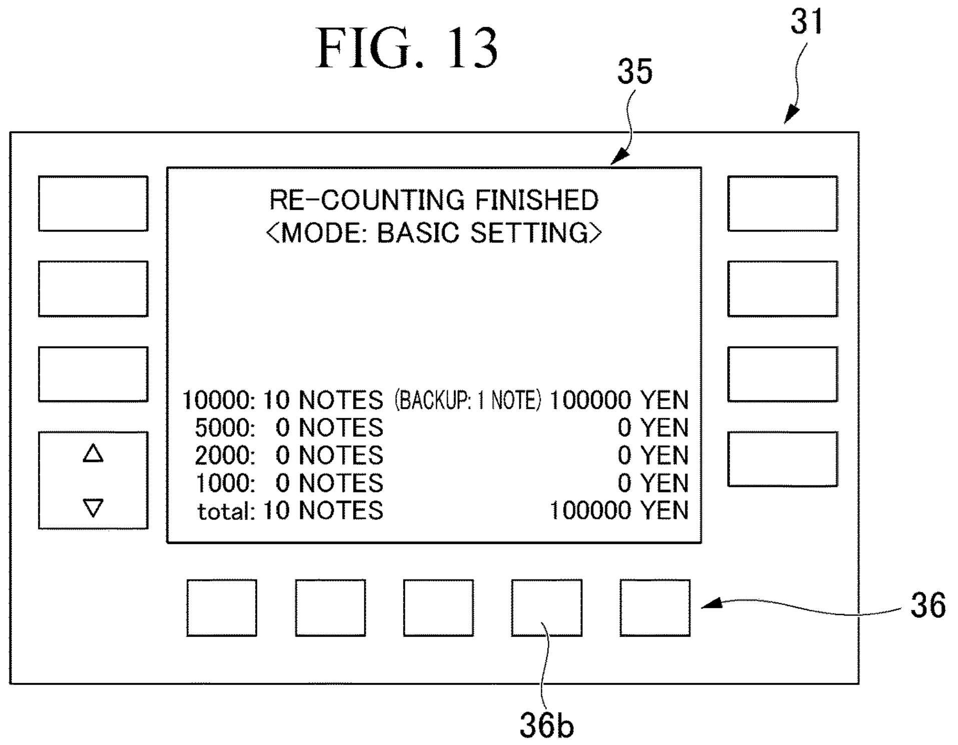
FIG. 13 is a front elevation view showing a display example of the operation display part of the banknote deposit processor serving as the embodiment of the currency deposit processor according to the present invention.
Figure 14:
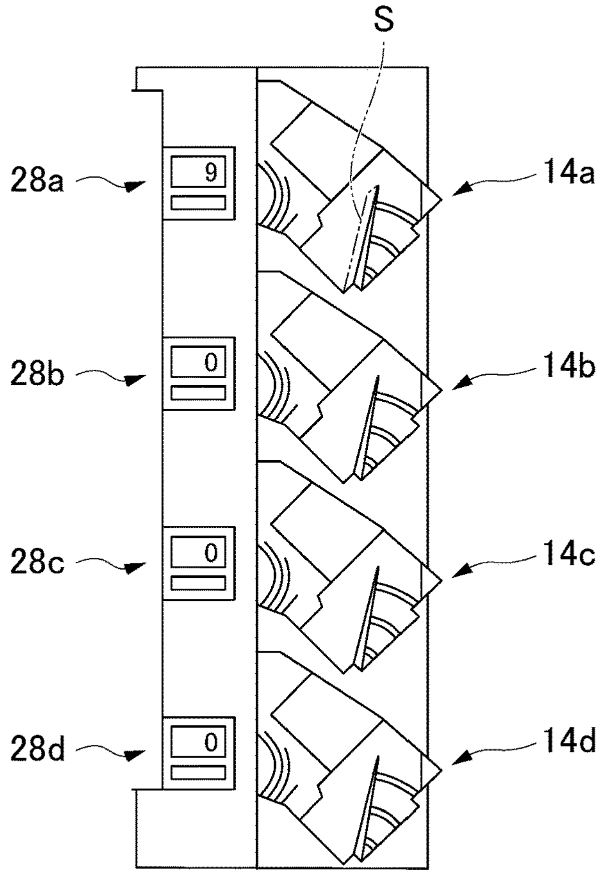
FIG. 14 is a front elevation view showing a display example of the collection display part of the banknote deposit processor serving as the embodiment of the currency deposit processor according to the present invention.

Then, when all of the banknotes S re-set in the deposit part 11 and removed during the fault recovery process, that is, all of the 9 10,000-yen notes are identified as 10,000-yen notes and collected in the collection part 14*a* and the deposit counting operation ends, the control unit 32 brings the display screen 35 and the collection display parts 28*a* to 28*d* into the display state shown in FIG. 13 and FIG. 14. That is to say, as shown in FIG. 14, the control unit 32 causes the collection display part 28*a* to display that 9 10,000-yen notes are present in the collection part 14*a*. In other words, the collection display part 28*a* displays information related to the data of the banknotes remaining after removal of banknotes, of the collection part 14*a* that reached its maximum capacity and from which banknotes S have been removed. Moreover, as shown in FIG. 13, the control unit 32 causes the display screen 35 to display the current state where the deposit count data is 10 10,000-yen notes, which is found by adding the re-inserted and counted 9 10,000-yen notes to the partially confirmed 1 10,000-yen note. Then, when the completion button 36*b* is pressed by the operator in this state, the control unit 32 confirms the contents of the second deposit transaction as the deposit count data being 10 10,000-yen notes to complete the transaction.

Having completed the second deposit transaction, although it is not shown in the drawings, the control unit 32 causes the collection display part 28*a* to display that 9 10,000-yen notes are present in the collection part 14*a*, and causes the display screen 35 to display that the current state is the waiting state and that the deposit count data is 0.

As described above, the control performed by the control unit 32 when the collection part 14*a* reaches its maximum capacity in the state where banknotes S confirmed in the previous deposit transaction and unconfirmed banknotes S being in the current deposit transaction are both present in a mixed manner, and a fault occurs after the banknotes S filling up the collection part 14*a* are removed therefrom, is referred to as special control. The special control is a control where the data of unconfirmed banknotes in the current deposit transaction included in the banknotes S filling up this is counted as a partially confirmed count, and the data of these banknotes counted as this partially confirmed count is added and reflected when the deposit process is performed again after the fault recovery process.

As described above, when performing the deposit continuation process after the occurrence of a fault, unlike the conventional control described above, the 100 banknotes S removed from the collection part 14*a* having collected 100 banknotes S and reaching its maximum capacity do not need to be added and re-inserted in the deposit part 11 and counted. Therefore, an effect of reducing the operational burden on the operator can be achieved. Furthermore, of the 100 banknotes S removed during deposit counting because any one of the collection parts 14*a* to 14*d* reaches its maximum capacity with 100 banknotes S, data of the quantity of notes confirmed in the deposit counting and removed can be treated as being "partially confirmed". Moreover, by looking at the displays of the collection display parts 28*a* to 28*d* and the display screen 35, it becomes clear at a glance that special control different from the control typically performed at normal times has been performed.

The banknote deposit processor 1 of the embodiment performs the following control in the deposit sorting mode 1.

As described above, the deposit sorting mode 1 is a setting in which face-up 10,000-yen notes are collected in the collection part 14*a*, face-down 10,000-yen notes in the collection part 14*b*, face-up 1,000-yen notes in the collection part 14*c*, and face-down 1,000-yen notes in the collection part 14*d*, respectively. That is to say, in the deposit sorting mode 1, 10,000-yen notes and 1,000-yen notes are collected separately by groups of face-up notes and face-down notes. In other words, the deposit sorting mode 1 is a mode in which deposit counting is performed while sorting banknotes S by the orientations thereof, that is, the face-up orientation and the face-down orientation.

Figure 15:
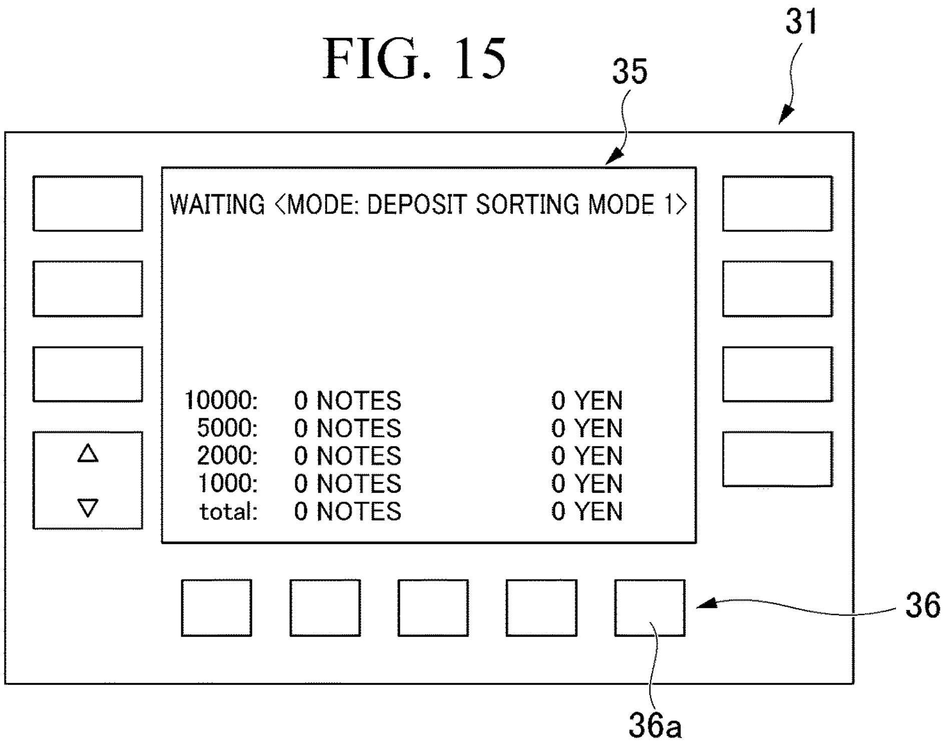
FIG. 15 is a front elevation view showing a display example of the operation display part of the banknote deposit processor serving as the embodiment of the currency deposit processor according to the present invention.
Figure 16:
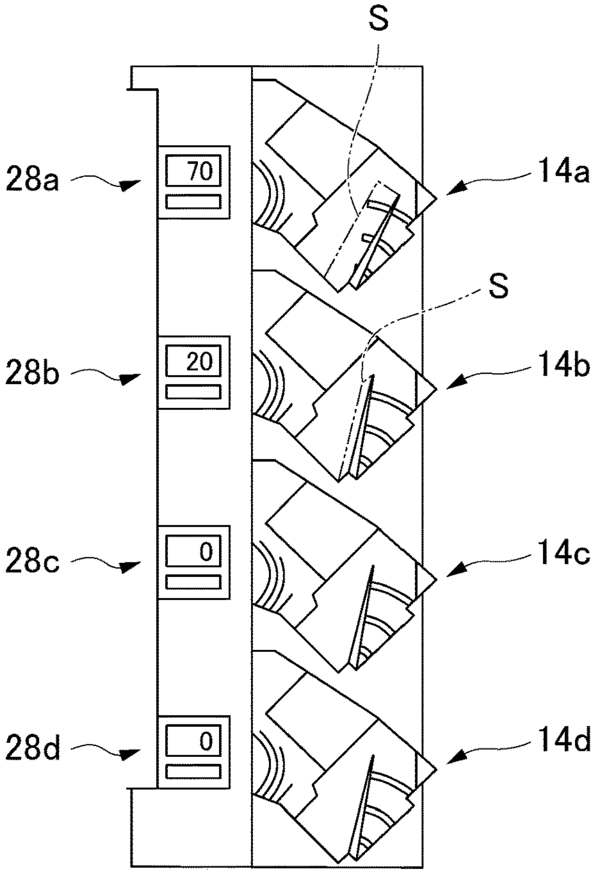
FIG. 16 is a front elevation view showing a display example of the collection display part of the banknote deposit processor serving as the embodiment of the currency deposit processor according to the present invention.

As with the above description, banknotes S of the first deposit process unit are set in the deposit part 11, and then the start button 36*a* of the operation part 36 is pressed. Then, as described above, the control unit 32 performs a deposit transaction for the banknotes S of the first deposit process unit. As a result of the first deposit transaction, for example, after a total deposit of 90 10,000-yen notes, namely 70 face-up 10,000-yen notes and 20 face-down 10,000-yen notes, has been counted, the completion button 36*b* of the operation part 36 is operated to confirm the transaction, and the processing comes to a state of waiting for the second deposit transaction. Then, the control unit 32 causes the display screen 35 and the collection display parts 28*a* to 28*d* to perform display as illustrated in FIG. 15 and FIG. 16. That is to say, as shown in FIG. 16, the control unit 32 causes the collection display part 28*a* corresponding to the collection part 14*a* to display that 70 face-up 10,000-yen notes are present in the uppermost collection part 14*a*. Moreover, the control unit 32 causes the collection display part 28*b* corresponding to the collection part 14*b* to display that 20 face-down 10,000-yen notes are present in the second uppermost collection part 14*b*. Furthermore, as shown in FIG. 15, the control unit 32 causes the display screen 35 to display that the current state is a waiting state and that the deposit count data is 0.

In this state, when banknotes S of the second deposit process unit are set in the deposit part 11 and the start button 36*a* of the operation part 36 is pressed, the control unit 32 performs a deposit transaction for the banknotes S of the second deposit process unit as the second deposit transaction. For example, assuming that the banknotes S of the second deposit process unit are 50 10,000-yen notes and are all face-up notes, then in the second deposit transaction, at first 30 10,000-yen face-up notes of the banknotes S of the second deposit process unit set in the deposit part 11 are transferred to the uppermost collection part 14*a*. As a result, the collection part 14*a* reaches the maximum capacity with the 100 banknotes S therein. Accordingly, the control unit 32 stops the taking-in part 55 and the transfer part 30, and uses the collection display part 28*a* and the display screen 35 to provide a guide to advise the operator that the collection part 14*a* has reached the maximum-capacity state and that deposit counting of the remaining banknotes S in the deposit part 11 therefore cannot be continued until the banknotes S in the collection part 14*a* have been removed.

Next, when the operator has removed all 100 banknotes S in the uppermost collection part 14*a* in accordance with the guide, the control unit 32 resumes the deposit counting of the remaining banknotes S in the deposit part 11. If, for example, a fault such as a transfer jam occurs in the banknote deposit processor 1 after the deposit process has been resumed, the control unit 32 stops the taking-in part 55 and the transfer part 30, and causes the display screen 35 to display a "fault recovery guide" to provide a guide for fault recovery. Then, the operator removes jammed banknotes collected in the transfer part 30 in accordance with the "fault recovery guide", and presses the reset button, not shown in the drawings, of the banknote deposit processor 1. Then, the control unit 32 causes the banknote deposit processor 1 to perform a reset operation. When this reset operation is completed and all remaining banknotes S in the transfer part 30 and all collection parts 14*a* to 14*d* have been removed, the control unit 32 determines the fault recovery process as being completed.

Figure 17:
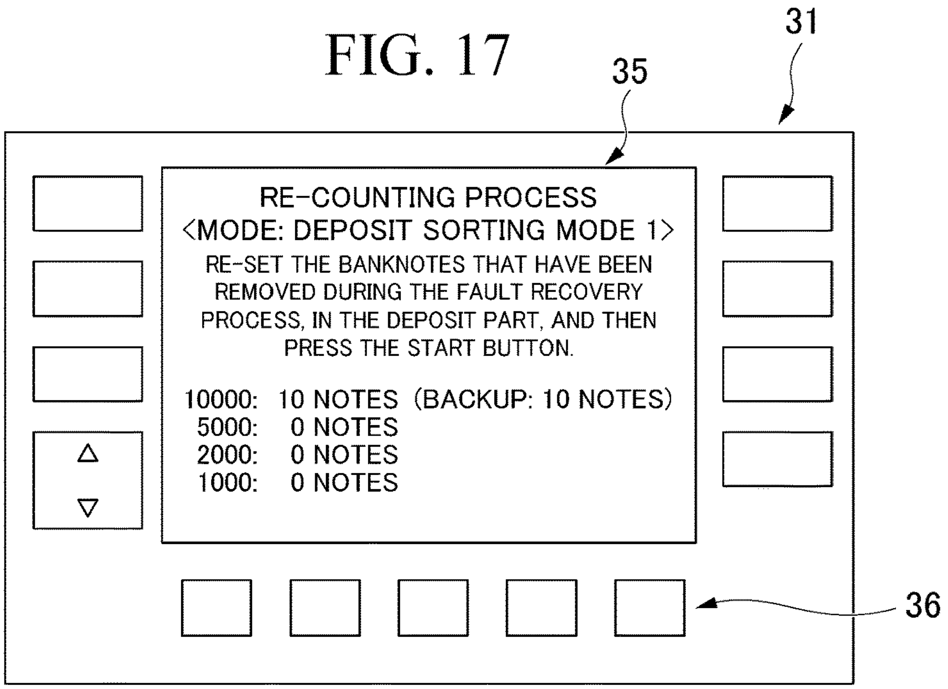
FIG. 17 is a front elevation view showing a display example of the operation display part of the banknote deposit processor serving as the embodiment of the currency deposit processor according to the present invention.
Figure 18:
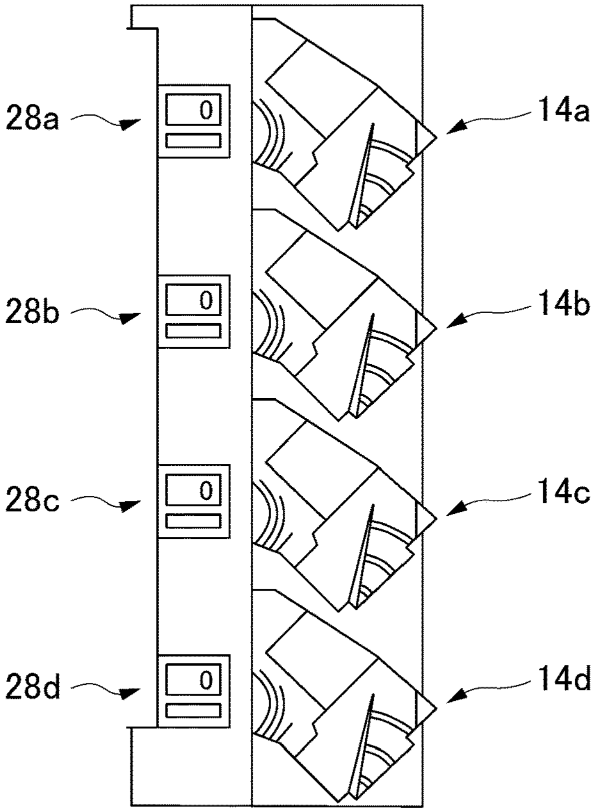
FIG. 18 is a front elevation view showing a display example of the collection display part of the banknote deposit processor serving as the embodiment of the currency deposit processor according to the present invention.

Subsequently, the control unit 32 causes the display screen 35 to display a guide for the operation related to the subsequent continuation process. Specifically, the guide performs a guide to re-insert in the deposit part 11 all of the banknotes S having been removed from the deposit part 11, the transfer part 30 and the collection parts 14*a* to 14*d* during the fault recovery process, and press the start button 36*a*. At this time, a guide for instructing to re-insert the 100 banknotes S removed from the uppermost collection part 14*a* to resolve the maximum capacity state is not performed. As a result, the operator does not re-insert in the deposit part 11 the 100 banknotes S removed from the uppermost collection part 14*a* to resolve the maximum capacity state. The operator then re-inserts only the 40 banknotes S removed from the deposit part 11, the transfer part 30 and the collection parts 14*a* to 14*d*, during the fault recovery process. At this time, the control unit 32 sets the display state of the display screen 35 as shown in FIG. 17 and FIG. 18. That is to say, as shown in FIG. 18, the control unit 32 causes the collection display parts 28*a* to 28*d* corresponding respectively to the collection parts 14*a* to 14*d* to display that no banknotes S are physically present in the collection parts 14*a* to 14*d*. Moreover, as shown in FIG. 17, the control unit 32 causes the display screen 35 to display that the current state is a waiting state and display the deposit count data as logical data such that 10 10,000-yen notes have been backed up in the banknote deposit processor 1.

Here, in the second deposit transaction 30 10,000-yen notes have been transferred to and collected in the collection part 14*a*, causing the collection part 14*a* to reach its maximum capacity with 100 banknotes S. As a result, let X be the 30 "partially confirmed" 10,000-yen notes of the 100 banknotes S removed from the collection part 14*a*. Also, let Y be the 20 10,000-yen notes in the collection part 14*b* that have been confirmed in the first deposit transaction and that were removed during the fault recovery process due to a subsequent fault. The data of the backed-up 10 10,000-yen notes is the calculation result of X−Y. Thus, the data of the 10 backed-up 10,000-yen notes displayed on the display screen 35 is information related to the data X of unconfirmed banknotes in the current deposit transaction, which is counted as partially confirmed.

In this state, the operator sets in the deposit part 11 40 banknotes S removed from the deposit part 11, the transfer part 30, and the collection parts 14*a* to 14*d* in accordance with the contents of the guide on the display screen 35, and performs a pressing operation on the start button 36*a*. Then, under the control of the control unit 32, the banknotes S in the deposit part 11 are fed out one by one, and the banknotes S identified as face-up 10,000-yen notes are collected in the uppermost collection part 14*a* and the banknotes identified as face-down 10,000-yen notes are collected in the collection part 14*b*. As a banknote gets collected, one note is added to the data of backed-up 10 notes, updating the deposit count data on the display screen 35.

Figure 19:
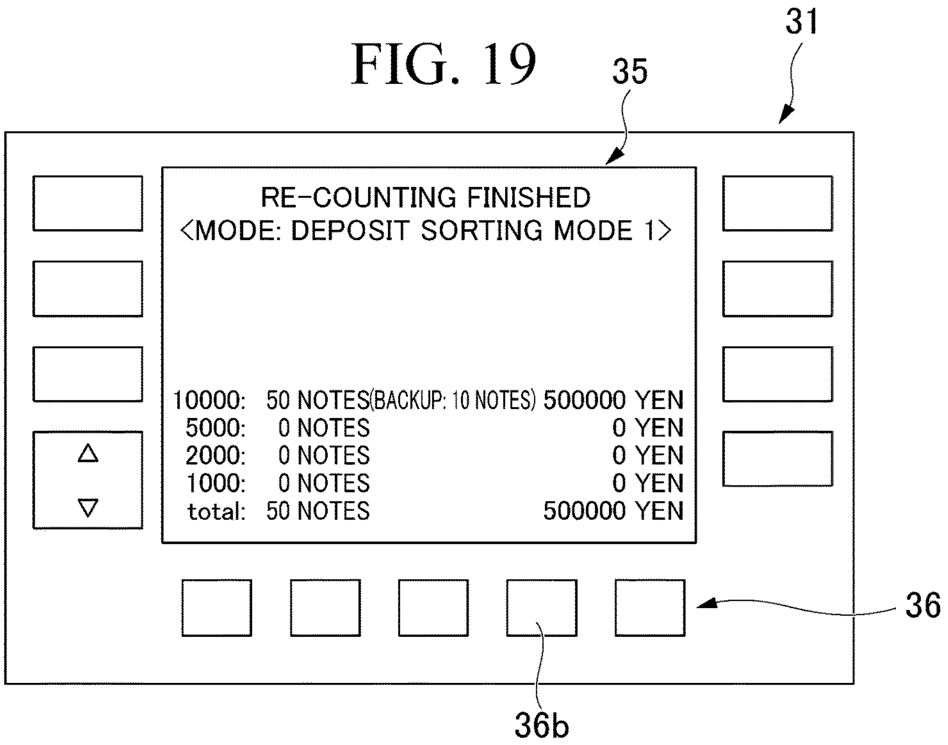
FIG. 19 is a front elevation view showing a display example of the operation display part of the banknote deposit processor serving as the embodiment of the currency deposit processor according to the present invention.
Figure 20:
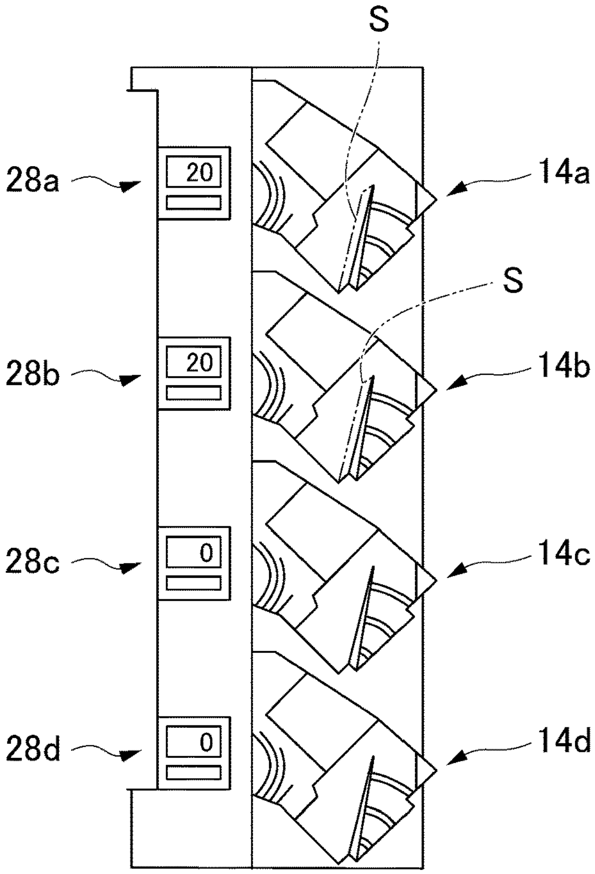
FIG. 20 is a front elevation view showing a display example of the collection display part of the banknote deposit processor serving as the embodiment of the currency deposit processor according to the present invention.

Then, when all of the banknotes S re-set in the deposit part 11 and removed during the fault recovery process, that is, when all of the 20 face-up 10,000-yen notes are identified as face-up 10,000-yen notes and collected in the collection part 14*a*, all of the 20 face-down 10,000-yen notes are identified as face-down 10,000-yen notes and collected in the collection part 14*b*, and the deposit counting operation ends, the control unit 32 brings the display screen 35 and the collection display parts 28*a* to 28*d* into the display state shown in FIG. 19 and FIG. 20. That is to say, as shown in FIG. 20, the control unit 32 causes the collection display part 28*a* to display that 20 face-up 10,000-yen notes are present in the collection part 14*a*. In other words, the collection display part 28*a* displays information of the collection part 14*a* that reached its maximum capacity and from which banknotes S have been removed, related to the data of the banknotes remaining after removal of banknotes. Moreover, the control unit 32 causes the collection display part 28*b* to display that 20 face-down 10,000-yen notes are present in the collection part 14*b*. Furthermore, as shown in FIG. 19, the control unit 32 causes the display screen 35 to display the current state where the deposit count data is 50 10,000-yen notes, which is found by adding 40 10,000-yen notes that have been re-inserted in the deposit part 11 and undergone continuation deposit counting to the data of the backed-up 10 10,000-yen notes. The 40 10,000-yen notes that have been re-inserted in the deposit part 11 and undergone continuous deposit counting are obtained by adding the 20 notes stored in the collection part 14*b* in the first transaction to the 20 notes removed from the deposit part 11, the transfer part 30, and the collection parts 14*a* to 14*d* in the second transaction which is obtained by subtracting, from the 50 notes placed in the deposit part 11 at the start of the second deposit transaction, 30 notes included in the filling-up 100 notes that have been removed.

Then, when the completion button 36*b* is pressed by the operator in this state, the control unit 32 confirms the contents of the second deposit transaction as the deposit count data being 50 10,000-yen notes to complete the transaction. Although not shown in the drawings, after the completion of the second deposit transaction, the control unit 32 causes the collection display part 28*a* to display that 20 face-up 10,000-yen notes are present in the collection part 14*a*. Moreover, the control unit 32 causes the collection display part 28*b* to display that 20 face-down 10,000-yen notes are present in the collection part 14*b*. Furthermore, the control unit 32 causes the display screen 35 to display that the current state is the waiting state and that the deposit count data is 0.

Here, the meaning of the above-mentioned X−Y calculation will be described. X is the number of "partially confirmed" banknotes S among the banknotes S at the time of being removed from the collection part 14*a* due to the collection part 14*a* having reached its maximum capacity before a fault occurred. On the other hand, Y is the number of banknotes S that should normally be "return-counted" when they were removed for the fault recovery process after the occurrence of the fault. By calculating the these difference, X−Y is used for determining whether or not the number of notes for which the "return count" should be performed can be set to 0, that is, whether or not offsetting the number of notes for which the return count should be performed is possible.

When the equation X−Y≥0 is satisfied, the number of notes for which "return count" should be performed can be set to 0. That is to say, when the equation X−Y≥0 is satisfied, it is not necessary to perform a return count, and the number of the difference of X−Y is backed up as logical data in the banknote deposit processor 1. Accordingly, the process as described above can be performed.

Conversely, when the equation X−Y≥0 is not satisfied and X−Y<0 is satisfied, the number of notes for which "return count" should be performed cannot be set to 0, and "return count" becomes necessary. Therefore, when X−Y<0 is satisfied, the process must be the same as that by means of the conventional control mentioned above. Therefore, only when the equation X−Y≥0 is satisfied, it is possible to perform the process that does not require the return process as described above. For example, in the above example, if X=30 and Y=40 for 50 10,000-yen notes placed in the deposit part 11 in the second deposit transaction, the number of banknotes S removed for the fault recovery process will be 50−30+40=60, which exceeds 50 10,000-yen notes that are placed in the deposit part 11 in the second deposit transaction. Such a case is avoided.

As described above, the control unit 32 executes the special control mentioned above under the condition that when another collection part 14*b* for the same domination is present separately from, for example, the collection part 14*a*, which is one of the collection parts 14*a* to 14*d* that reached its maximum capacity and from which banknotes S have been removed, the value obtained by subtracting the number Y of banknotes S confirmed in the other collection part 14*b* up to the previous deposit transaction from the number X of banknotes S counted as partially confirmed is 0 or higher. It should be noted that, the control unit 32 executes the special control mentioned above under the condition that when a plurality of other collection parts for the same domination are present separately from one of the collection parts 14*a* to 14*d*, which reached its maximum capacity and from which banknotes S have been removed, the value obtained by subtracting the sum Y of the number of banknotes S confirmed in the other collection parts up to the previous deposit transaction from the number X of banknotes S counted as partially confirmed is 0 or higher.

Here, when X−Y<0 is satisfied, also in the present embodiment, control is performed so as to perform "return count" as in the conventional technique. When "return count" is required as mentioned above, in the conventional control, after the fault recovery process is completed, the "return process operation" is guided first, and once the "return process operation" is completed and subsequently the start button 36*a* is pressed, the second transaction will be re-executed.

In the banknote deposit processor 1 of the present embodiment, this process is partially changed, and the "return process operation" and the "second deposit transaction" are collectively performed as one process. That is to say, after the fault recovery process is completed, the operator re-inserts in the deposit part 11 the 100 banknotes S removed from the collection part 14*a* to resolve the maximum-capacity state and all of the banknotes S removed from the deposit part 11, the transfer part 30, and the collection parts 14*a* to 14*d* during the fault recovery process, and presses the start button 36*a*. As a result, the control unit 32 controls the taking-in part 55 and the transfer part 30 to feed out the banknotes of the deposit part 11 one by one, so that banknotes S identified as face-up 10,000-yen notes are collected in the collection part 14*a* and banknotes S identified as face-down 10,000-yen notes are collected in the collection part 14*b*, respectively. Then, even when 70 banknotes S identified as face-up 10,000-yen notes have been collected in the collection part 14*a* and 20 banknotes S identified as face-down 10,000-yen notes have been collected in the collection part 14*b* as described above, the control unit 32 continues to perform the deposit counting operation without stopping the counting operation temporarily. In other words, after 70 banknotes S identified as face-up 10,000-yen notes have been collected in the collection part 14*a* and 20 banknotes S identified as face-down 10,000-yen notes have been collected in the collection part 14*b*, the operation of pressing the count button 36*c* is not necessary. When the collection part 14*a* is full with 100 notes, the control unit 32 causes the taking-in part 55 and the transfer part 30 to stop temporarily, and when all the banknotes S in the collection part 14*a* have been removed, the control unit 32 resumes the deposit counting of the remaining banknotes S in the deposit part 11. In this manner, when the deposit counting is completed normally, the control unit 32 causes the display screen 35 and the collection display parts 28*a* to 28*d* to display that the deposit counting result of the second deposit transaction is 500,000 yen in total including 50 10,000-yen notes, and that 20 face-up 10,000-yen notes have been collected in the collection part 14*a* and 20 face-down 10,000-yen notes have been collected in the collection part 14*b*, and the control unit 32 causes the display screen 35 to display that the second transaction can be completed by pressing the completion button 36*b*. In this manner, the control unit 32 performs both a return count of the banknotes confirmed up to the previous deposit transaction, related to the fault recovery process, and a count related to the re-deposit process.

Further to the control in the basic setting mode described above, in this control, banknotes of each denomination such as 10,000-yen notes, 5,000-yen notes, 2,000-yen notes, and 1,000-yen notes are collected only in one collection part. That is to say, when it comes to 10,000-yen notes, even if the collection part 14*a* for 10,000-yen notes reaches its maximum capacity and banknotes S in this collection part 14*a* are removed to generate a number of "partially confirmed" notes, 10,000-yen notes will not be collected in the collection parts 14*b* to 14*d* other than the collection part 14*a*. For this reason, the number of 10,000-yen notes for which "return counting" should be performed cannot be other than 0. Therefore, it is impossible that X−Y<0 becomes satisfied. Also, the equation X−Y≥0 is always satisfied. Therefore, in the control in the basic setting mode, the process described above that does not require the return process is possible.

According to the banknote deposit processor 1 of the present embodiment, in the basic setting mode, when, for example, the collection part 14*a*, which is one of the collection parts 14*a* to 14*d*, reaches its maximum capacity with both banknotes S confirmed up to the previous deposit transaction and banknotes S unconfirmed in the current deposit transaction, and a fault occurs after the filling-up banknotes S are removed, the control unit 32 performs special control in which the data on the banknotes unconfirmed in the current deposit transaction and included in the filling-up banknotes S is calculated as a partially confirmed count, and the data on the banknotes calculated as the partially confirmed count is added and reflected at the time of a re-deposit transaction after a fault recovery process. Therefore, even if a fault occurs after filling-up banknotes are removed during a deposit transaction, it is not necessary to add and re-insert in the deposit part 11 the filling-up banknotes that were removed therefrom during the deposit transaction and to count them. Therefore, it is possible to reduce the recovery-related burden on the operator.

Moreover, in the deposit sorting mode 1, the control unit 32 executes the special control mentioned above under the condition that when another collection part 14*b* for the same domination is present separately from, for example, the collection part 14*a*, which is one of the collection parts 14*a* to 14*d* that reached its maximum capacity and from which banknotes S have been removed, the value obtained by subtracting the number Y of banknotes S confirmed in the other collection part 14*b* up to the previous deposit transaction from the number X of banknotes S counted as partially confirmed is 0 or higher. Therefore, even in the case where among the collection parts 14*a* to 14*d*, there are collection parts for the same denominations as that for banknotes S that need to be removed to resolve its maximum capacity state, and banknotes S confirmed in the previous transaction are present in each of them, the special control will be activated as long as a specific condition is satisfied.

Moreover, the control unit 32 performs both a return count of the banknotes S confirmed up to the previous deposit transaction, related to the fault recovery process, and a count related to the re-deposit process. As a result, since the return process and the re-deposit transaction can be performed together as a series of processes, a reduction in time required therefor can be achieved and the operational burden on the operator can be further reduced.

Also, there are included the display screen 35 that displays information related to the data of the unconfirmed banknotes in the current deposit transaction, which is counted as partially confirmed, and the collection display parts 28*a* to 28*d* that display information related to the data of the banknotes in the collection parts 14*a* to 14*d* that reached the maximum capacity thereof and from which banknotes S have been removed. As a result, after a fault recovery process, the operator can be guided by the information displayed on the display screen 35 and the collection display parts 28*a* to 28*d* and ordinarily perform a continuation deposit process without being consciously aware of partial confirmation internally performed by the banknote deposit processor 1 side or the offsetting process.

It should be noted that, for the sake of simplicity, the banknote deposit processor 1 of the present embodiment has been described as having four collection parts 14*a* to 14*d*, however, the number of collection parts is not limited to this example. The number of collection parts may be, for example, two, three, or even eight. Moreover, the number of banknotes S that fill up one of the collection parts 14*a* to 14*d* has been described as 100, however, the number is not limited to this example, and it may be any number, for example, 50 or 200, as long as it is a preliminarily set predetermined number. Moreover, if backed-up data is present, a message to that effect such as "backup" may be displayed on the display screen 35, or a notification may be performed by flashing the deposit count data. Furthermore, the backed-up data may be stored in the memory part 33. With a mechanism that enables data to be stored in the memory part 33, for example, even if the power to the banknote deposit processor 1 is turned OFF or ON during a fault recovery process, backed-up data will not be cleared to 0 and will be stored and remains backed-up in the memory part 33. As a result, processing can be continued after the power is restored to the ON state.

Moreover, in the banknote deposit processor 1 of the present embodiment, a case has been described in which the collection part 14*a* for 10,000-yen notes reaches its maximum capacity during the second deposit transaction and banknotes S in the collection part 14*a* are removed. Of course, the embodiment is not limited to this example, and it also applies to those cases where the collection parts 14*b* to 14*d* for other denominations other than 10,000-yen notes reach the maximum capacity thereof.

Furthermore, in the banknote deposit processor 1 of the present embodiment, a case has been described in which a fault such as a jam occurs and a re-deposit process is performed following the completion of the fault recovery process, after the collection part 14*a* for 10,000-yen notes reaches its maximum capacity during the second deposit transaction and banknotes S in the collection part 14*a* are removed. However, for example, there may be a case where the re-deposit process is not performed following the completion of the fault recovery process and the second deposit transaction itself is canceled. In such a case, cancellation is possible by pressing a "cancel" button not shown in the drawings. Here, in such a case, the special control itself under which "partial confirmation" has been performed will also be canceled. Therefore, it is necessary to always perform "return process" as the subsequent processing. As a result, the guide is performed on the display screen 35 so as to execute the processes by means of the same control as the conventional control mentioned above.

Modified Example 1

The banknote deposit processor 1 for depositing banknotes only has been taken as an example in the above description. However, the embodiment is not limited to this example, and may also be applied in a similar manner to a coin deposit processor for processing coins, which are media different from banknotes, and for depositing coins only. For example, the embodiment may be applied to a coin deposit processor having no temporary holding part in which coins placed in a coin deposit part are fed out, transferred, and discriminated by denomination thereof, and on the basis of the result of that, the coins are stored, without through a temporary holding part, in a storage part (a storage box or a large bag) that reaches its maximum capacity with a predetermined number thereof. An application of the embodiment to such a coin deposit processor also enables the same effect.

INDUSTRIAL APPLICABILITY

According to the currency deposit processor described above, it is possible to reduce the recovery-related burden on the operator even if a fault occurs after currencies resulting in a maximum capacity are removed during a deposit transaction.

DESCRIPTION OF REFERENCE SYMBOLS

1 Banknote deposit processor (currency deposit processor)
11 Deposit part
14*a* to 14*d* Collection part (storage part)
28*a* to 28*d* Collection display part (second display part)
35 Display screen (first display part)
32 Control unit
S Banknote (currency)

The invention claimed is:

1. A currency deposit processor that transfers currencies set in a deposit part one by one, discriminates the currencies by denominations, stores the currencies in denominations in a storage part without temporarily holding the currencies, and confirms the deposited currencies for each transaction, the currency deposit processor comprising:

a control unit that, when one storage part reaches its maximum capacity with both currencies confirmed up to a previous deposit transaction and currencies unconfirmed in a current deposit transaction and a failure occurs after the filling-up currencies are removed, performs a special control, in which data on the currencies unconfirmed in the current deposit transaction and included in the filling-up currencies is calculated as a partial confirmation, and the data on the currencies calculated as the partial confirmation is added and reflected at a time of a re-deposit process after a fault recovery process, wherein, when there is another storage part for a same denomination aside from the one storage part that was full and from which the currencies have been removed, the control unit executes the special control on condition that:

$$X-Y \geq 0$$

where Y is a value of a number of the currencies confirmed up to the previous deposit transaction in the other storage part and X is a number of the currencies calculated in the current deposit transaction as the partial confirmation.

2. The currency deposit processor according to claim 1, wherein the control unit performs both a return count of the currencies confirmed up to the previous deposit transaction, related to the fault recovery process, and a count related to the re-deposit process.

3. The currency deposit processor according to claim 1, comprising:

a first display part that displays information related to the data of the unconfirmed currencies in the current deposit transaction, which is calculated as the partial confirmation; and a second display part that displays information related to data of currencies in the storage part that was full and from which the currencies have been removed.

4. The currency deposit processor according to claim 1, comprising a plurality of storage parts that include one storage part for collecting normal currencies of the currencies and another storage part for collecting damaged currencies of the currencies, for each denomination, and wherein the currency deposit processor collects the normal currencies and the damaged currencies in the corresponding storage parts.

* * * * *